US012794532B2

(12) United States Patent
Yapici et al.

(10) Patent No.: US 12,794,532 B2
(45) **Date of Patent: *Nov. 10, 2026**

(54) RANGING VIA RSRP FOR RIS LINKS

(71) Applicant: QUALCOMM Incorporated, San Diego, CA (US)

(72) Inventors: Yavuz Yapici, Florham Park, NJ (US); Narayan Prasad, Westfield, NJ (US); Tao Luo, San Diego, CA (US); Junyi Li, Fairless Hills, PA (US)

(73) Assignee: QUALCOMM INCORPORATED, San Diego, CA (US)

(*) Notice: Subject to any disclaimer, the term of this patent is extended or adjusted under 35 U.S.C. 154(b) by 381 days.

This patent is subject to a terminal disclaimer.

(21) Appl. No.: 18/188,405

(22) Filed: Mar. 22, 2023

(65) Prior Publication Data

US 2024/0322887 A1 Sep. 26, 2024

(51) Int. Cl.
*H04B 7/06* (2006.01)
*H04B 17/327* (2015.01)

(52) U.S. Cl.
CPC ......... *H04B 7/0639* (2013.01); *H04B 17/327* (2015.01)

(58) Field of Classification Search
CPC .. H04B 7/0639; H04B 17/327; H04B 7/0617; H04B 7/04013; G01S 11/06
See application file for complete search history.

(56) References Cited

U.S. PATENT DOCUMENTS

| | | | | |
|---|---|---|---|---|
| 11,595,106 | B1 * | 2/2023 | Gurelli | H04B 7/0695 |
| 11,909,479 | B2 * | 2/2024 | Khojastepour | H04B 7/04013 |
| 2023/0048721 | A1 * | 2/2023 | Gurelli | H04B 17/382 |
| 2023/0048739 | A1 * | 2/2023 | Bengtsson | H04W 16/28 |

(Continued)

FOREIGN PATENT DOCUMENTS

| | | | | |
|---|---|---|---|---|
| WO | WO-2023025888 A2 * | 3/2023 | | H04B 7/026 |
| WO | WO-2024105647 A1 * | 5/2024 | | H01Q 1/00 |
| WO | WO-2024225946 A1 * | 10/2024 | | |

OTHER PUBLICATIONS

Fast Near-Field Beam Training for Extremely Large-Scale Array (Year: 2022).*

(Continued)

*Primary Examiner* — Nizar N Sivji
(74) *Attorney, Agent, or Firm* — Procopio, Cory, Hargreaves & Savitch LLP

(57) ABSTRACT

The apparatus may be a wireless device, or a component of a wireless device, configured to receive a plurality of reference signal transmissions associated with a corresponding plurality of configurations of a configurable array of reflective elements and to provide, based on the plurality of reference signal transmissions, information indicating an estimated distance from the wireless device to the configurable array of reflective elements. The apparatus may be a RIS, a RIS controller, a base station, or a component of any of the RIS, the RIS controller, or the base station, configured to provide a plurality of reference signal transmissions associated with a corresponding plurality of configurations (Continued)

of a configurable array of reflective elements, and obtain, based on the plurality of reference signal transmissions, information indicating an estimated distance from a wireless device to the configurable array of reflective elements.

26 Claims, 17 Drawing Sheets

(56) References Cited

U.S. PATENT DOCUMENTS

| | | | | |
|---|---|---|---|---|
| 2024/0322863 | A1 | 9/2024 | Yapici et al. | |
| 2024/0322864 | A1 | 9/2024 | Yapici et al. | |
| 2024/0356625 | A1* | 10/2024 | Walker | H04B 7/088 |
| 2025/0175294 | A1* | 5/2025 | Li | H04B 7/06952 |

OTHER PUBLICATIONS

Near-Field Beam Management in LIS-Assisted mmWave Systems (Year: 2021).*

International Search Report and Written Opinion—PCT/US2024/017622—ISA/EPO—Jun. 24, 2024.

* cited by examiner

RANGING VIA RSRP FOR RIS LINKS

TECHNICAL FIELD

The present disclosure relates generally to communication systems, and more particularly, to wireless communication that includes a reconfigurable intelligent surface (RIS) to communicate with the UE.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device, or a component of a wireless device, configured to receive a plurality of reference signal transmissions associated with a corresponding plurality of configurations of a configurable array of reflective elements and to provide, based on the plurality of reference signal transmissions, information indicating an estimated distance from the wireless device to the configurable array of reflective elements.

In an aspect of the disclosure, a method, a computer-readable medium, and an apparatus are provided. The apparatus may be a RIS, a RIS controller, a base station, or a component of any of the RIS, the RIS controller, or the base station, configured to provide a plurality of reference signal transmissions associated with a corresponding plurality of configurations of a configurable array of reflective elements, and obtain, based on the plurality of reference signal transmissions, information indicating an estimated distance from a wireless device to the configurable array of reflective elements.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
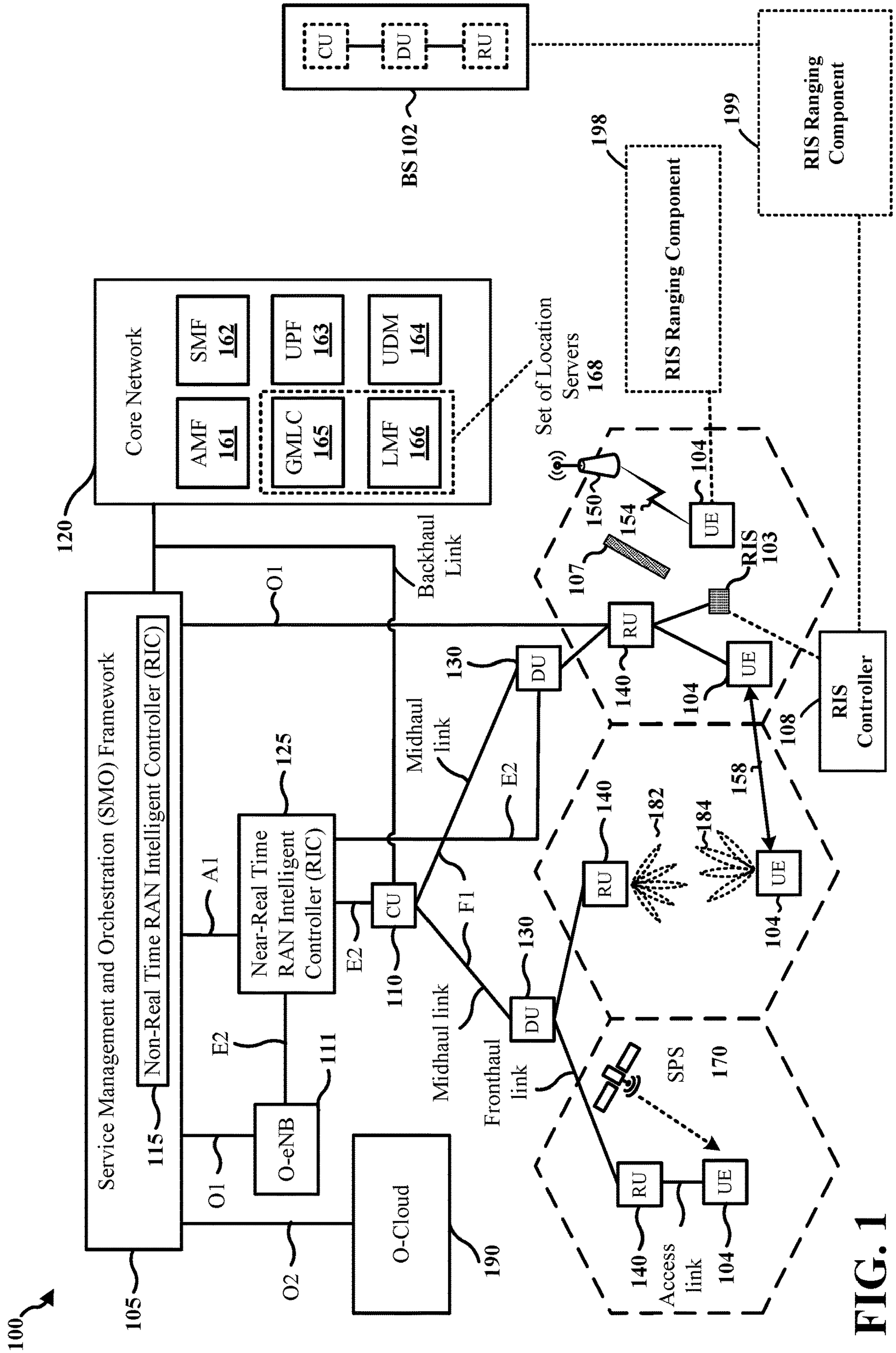
FIG. 1 is a diagram illustrating an example of a wireless communications system and an access network.

In some aspects of wireless communication, a network may include a RIS used to circumvent blockages between a base station and a wireless device (e.g., a UE) that the base station serves. In some contexts, a RIS may also be referred to as one of a meta-surface, a smart surface, or an intelligent reflection surface(s) (IRS) and may be related to, or incorporate, meta-devices, or meta-materials (e.g., tunable, active, passive, or programmable meta-materials). and may be distinguished from a reflectarray (e.g., a non-reconfigurable, or static, reflecting surface). A RIS, in some aspects, is an array of reconfigurable reflecting elements that may, in some implementations, include passive and/or active reflecting elements. The RIS may be used to improve spectral efficiency at low deployment cost. However, RIS-assisted links (links from a base station to a UE via a RIS) may experience a near-field effect since the effective aperture size of a RIS is generally large compared to classical transmit arrays. In some aspects, a RIS may perform a beam focusing operation, e.g., an operation that includes both steering a beam towards a direction and also focusing the beam at a specific distance (e.g., using a specific focusing distance), to increase a received power at a UE. In order to achieve the most benefit from beam focusing it is useful to know the distance from the RIS to the UE for which the beam focusing is performed. Although a transmitter-to-RIS distance may be relatively stable and may be known by each transmitter using the RIS, the highly-variable RIS-to-receiver distance may not be known (e.g., available to the transmitter, the RIS, a RIS controller, or a receiver such as a UE). The RIS-to-receiver distance may particularly not be available, or known, during initial communication over cascaded transmitter-RIS-receiver links, accordingly, this may present challenges which makes beam focusing applications difficult due to the lack of the distance information (for determining an optimal focusing distance, i.e., a distance at which the signal power for a target is to be optimized, which in some aspects, may alternatively be referred to as, or be related to, a focal distance or focal length).

Various aspects relate generally to obtaining a RIS-to-receiver distance (e.g., a distance between a RIS and a UE being served via the RIS). Some aspects more specifically relate to obtaining the distance between the RIS and the UE with sufficient accuracy to achieve, or obtain, the benefits of beam focusing over a beamforming operation that steers a beam towards a direction without focusing the beam at a specific distance (or focusing with an "infinite" focal length or focusing distance). Aspects disclosed herein may avoid issues associated with power fluctuations (e.g., due to changing channel conditions between a 'calibration' operation and a measurement operation). For example, a reference signal received power (RSRP) based localization which compares the measured RSRP to a lookup table of pre-calculated or pre-measured power levels may suffer from power fluctuations due to a changing channel between generating the lookup table and measuring the RSRP. Accordingly, aspects disclosed herein are based on RSRP measurements corresponding to different RIS configurations (e.g., with different numbers of RIS elements used for beamforming) made during a short time period (e.g., a time period for which it may be assumed that each reference signal experiences similar channel conditions) to estimate a distance between a wireless device and the RIS as discussed herein. In some aspects discussed herein, the distance estimation may be based on relative RSRPs (e.g., an ordering of the measured RSRPs) for the different RIS configurations.

For example, a network device (e.g., at least a component of a network device including one of a RIS, a RIS controller, a base station, etc.) may provide, and a wireless device may receive, a plurality of reference signal transmissions associated with a corresponding plurality of configurations of a RIS (e.g., or, more generally, a configurable array of reflective elements). The wireless device, in some aspects, may provide, and the network device may obtain, based on the plurality of reference signal transmissions, information indicating an estimated distance from the wireless device to the RIS (e.g., the configurable array of reflective elements). In order to provide the information to the network device, the wireless device, in some aspects, may measure a received signal power, e.g., a RSRP, for each of the plurality of reference signal transmissions and the transmitted information may be measurement information based on measuring the received signal power. In some aspects, to provide the measurement information the wireless device may transmit, and the network device may receive, the measurement information including one or more of a first indication of a first set of received signal powers associated with the plurality of reference signal transmissions, a second indication of a second set of relative received signal powers (e.g., an ordering from highest power to lowest power or vice versa) associated with the plurality of reference signal transmissions, a distance estimate (e.g., an estimated distance calculated, or determined, by the UE), or a third indication of an estimated range of distances (e.g., an upper and lower bound for an estimated distance or an indication of a particular range from a set of known (candidate) ranges, for example, based on the plurality of configurations of the RIS). The network device may, based on the measurement information, determine the estimated distance. In some aspects, the network device may configure the RIS in a particular configuration based on the information indicating the estimated distance (e.g., based on the determined estimated distance) and may provide, and the wireless device may receive, at least one signal via the RIS in the particular configuration. In some aspects, additional iterations of the operations described above may be used to refine the distance estimation.

Particular aspects of the subject matter described in this disclosure can be implemented to realize one or more of the following potential advantages. In some examples, by comparing RSRP measurements between different RIS configurations, aspects presented herein can be used to support determination of distance between a RIS and a wireless device. Aspects presented herein may achieve higher estimation accuracy than the normal RSRP ranging approach because the impact of channel variability may be eliminated by using relative values among multiple measurements experiencing the same channel (e.g., the channel characteristics are assumed to remain relatively constant on the time scale of the measurements for the different RIS configurations discussed above). Accordingly, the calculated, or estimated, distance between the RIS and the wireless device may be used by a base station or RIS controller to reconfigure the RIS to do beam focusing at a desired distance (e.g., based on the estimated distance) to improve a received power at the wireless device (e.g., for a same transmitted power). Additionally, some aspects may also be implemented for low-cost transmitters with a single antenna, or a transmit array with a single RF chain and no subarray (so that array size cannot be changed to reshape the beam) since the beam formation is performed at the RIS and not at the transmitter.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some aspects, the network may include a reconfiguration intelligent surface (RIS) 103 that may reflect beamformed (or beam-focused) communication between the RU 140 and a UE 104 to avoid a blockage 107 that blocks a directional beam between the RU 140 (or an associated base station 102) and the UE 104. A RIS is one example of a name for a passive array that reflects or refracts communication between a base station and a UE to control an angle of reflection, e.g., without decoding the communication. In other examples, the RIS may be called a meta-surface, a smart surface, or an IRS and may be related to, or incorporate, meta-devices, or meta-materials (e.g., tunable, active, passive, or programmable meta-materials). The RIS 103 may be associated with a controller component (e.g., RIS controller 108). Discovery information, such as RIS capability information and/or position information for the RIS 103 may be transmitted by the controller component (e.g., RIS controller 108), e.g., to a UE 104 via sidelink or to a base station via uplink. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi™ based on the Institute of Electrical and Electronics Engineers (IEEE) 802.11 standard, LTE, or NR.

The wireless communications system may further include a Wi-Fi™ AP 150 in communication with UEs 104 (also referred to as Wi-Fi™ stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a RIS ranging component 198 that may be configured to receive a plurality of reference signal transmissions associated with a corresponding plurality of configurations of a configurable array of reflective elements and to provide, based on the plurality of reference signal transmissions, information indicating an estimated distance from the wireless device to the configurable array of reflective elements (e.g., a RIS). In certain aspects, the base station 102, or a RIS controller 108 associated with a RIS 103, may have a RIS ranging component 199 that may be configured to provide a plurality of reference signal transmissions associated with a corresponding plurality of configurations of a configurable array of reflective elements, and obtain, based on the plurality of reference signal transmissions, information indicating an estimated distance from a wireless device to the configurable array of reflective elements. While the discussion below may focus on a single RIS and wireless device, aspects, may be applied for multiple RISs associated with a single base station, or each of multiple wireless devices associated with a single RIS.

Figures 2A, 2B, 2C, 2D:
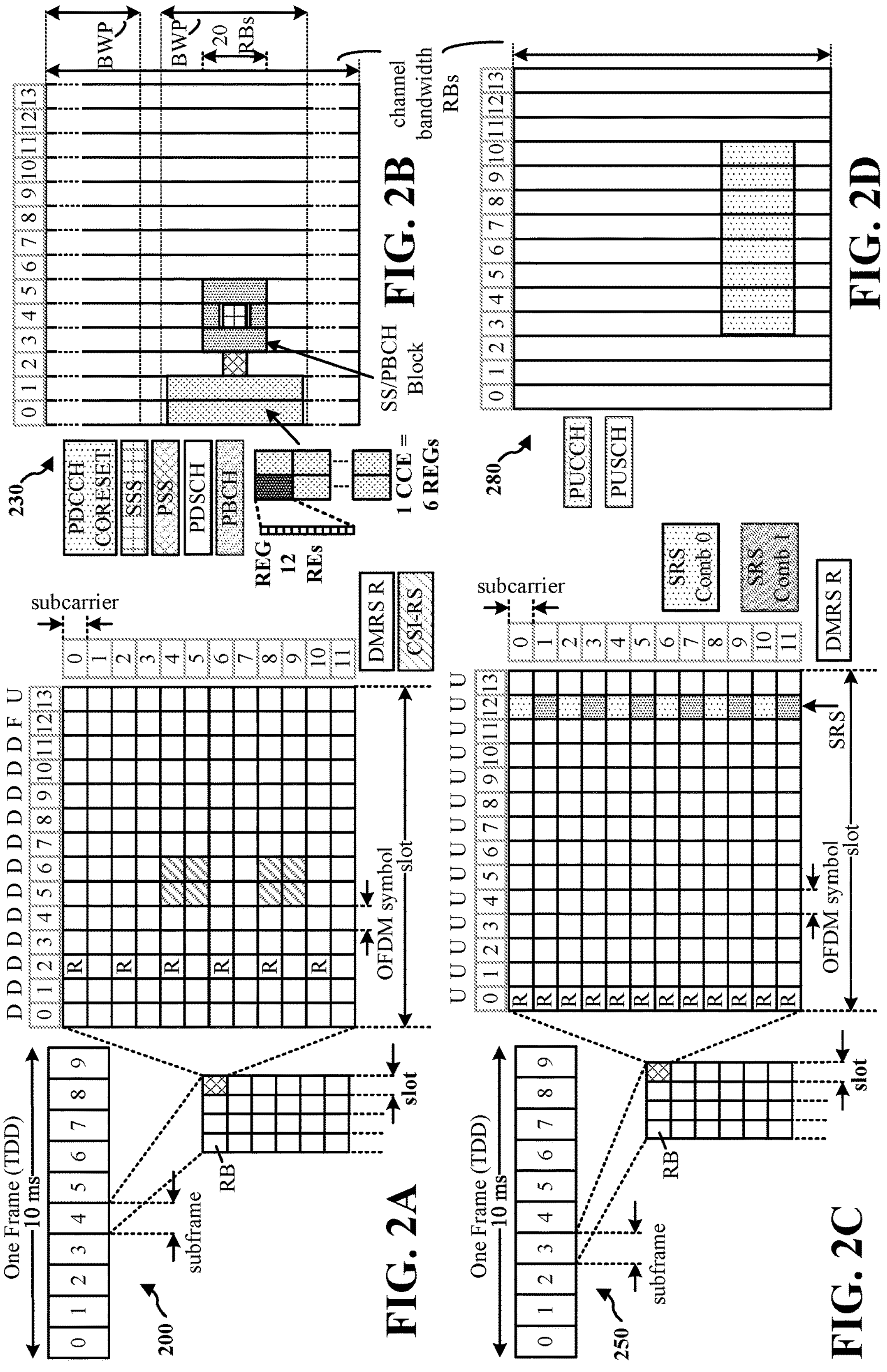
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
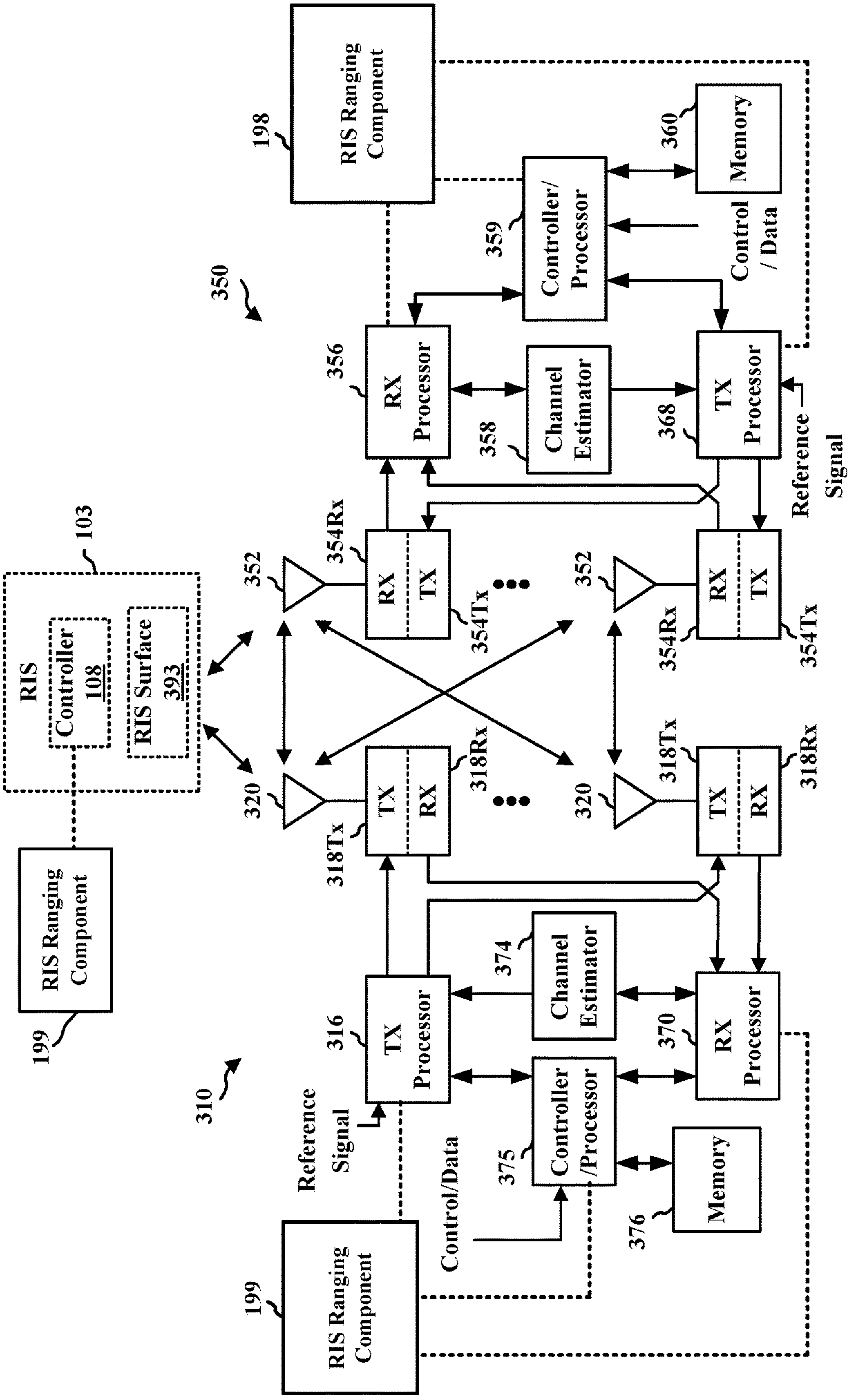
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

FIG. 3 illustrates an example of a RIS 103 that is configured to reflect communication between the base station 310 and the UE 350. The RIS 103 includes a RIS surface 393 of elements that are reconfigurable for different incident angles and reflection angles. The RIS 103 may also include a RIS controller 108 that controls the reflection coefficients of the RIS surface 393 to adjust the angles, e.g., as described in connection with FIG. 1. In some aspects, the RIS controller 108 may include communication components, e.g., including Tx processor, and Rx processor, and/or a controller processor, such as described for the base station 310 and/or UE 350, in order to receive control signaling regarding the control of the RIS surface 393.

At least one of the TX processor 368, the RX processor 356, and the controller/processor 359 may be configured to perform aspects in connection with the RIS ranging component 198 of FIG. 1.

At least one of the TX processor 316, the RX processor 370, and the controller/processor 375 may be configured to perform aspects in connection with the RIS ranging component 199 of FIG. 1.

In some aspects of wireless communication, a network may include a RIS used to circumvent blockages between a base station and a wireless device (e.g., a UE) that the base station serves. A RIS, in some aspects, is an array of reconfigurable reflecting elements that may, in some implementations, include passive and/or active reflecting elements. A RIS, in some aspects, may include an array of small, passive elements such as antennas, RF switches, or diodes. In some aspects, these elements may be arranged in a 2D grid and may be individually controllable to modify the phase and amplitude of impinging, or incoming, electromagnetic waves. The RIS may also include be associated with, or include, a controller, which may be a dedicated unit or a software-based system running on a base station, a component of the RIS, or a user device. The RIS may be used to improve spectral efficiency at low deployment cost. The RIS may perform one of beamforming or beam focusing to improve the power received at one or more wireless devices. Beamforming, or beam focusing, techniques, in some aspects, involve adjusting the direction and shape of electromagnetic waves to optimize signal strength and reduce interference. By adjusting the properties of incoming waves, a RIS can steer and focus the signal in a specific direction (e.g., via beamforming) or towards a particular location (e.g., in a specific direction with a specific focusing distance via beam focusing). This allows the RIS to enhance the signal strength and quality of wireless transmissions. However, RIS-assisted links (links from a base station to a UE via a RIS) may experience a near-field effect since the effective aperture size of a RIS is generally large compared to classical transmit arrays.

In some aspects, in order for a RIS to perform an optimal beam focusing operation, e.g., an operation that includes both steering a beam towards a direction and also focusing the beam at a specific distance (e.g., using a specific focusing distance), it is useful to know the distance from the RIS to the UE for which the beam focusing is performed. Although a transmitter-to-RIS distance may be relatively stable and may be known by each transmitter using the RIS, the highly-variable RIS-to-receiver distance may not be known (e.g., available to the transmitter, the RIS, a RIS controller, or a receiver such as a UE). The RIS-to-receiver distance may particularly not be available, or known, during initial communication over cascaded transmitter-RIS-receiver links, accordingly, this may present challenges which makes beam focusing applications difficult due to the lack of the distance information (e.g., using an inaccurate focusing distance may not produce the optimal power possible for beam focusing).

Various aspects relate generally to obtaining a RIS-to-receiver distance (e.g., a distance between a RIS and a UE being served via the RIS). Some aspects more specifically relate to obtaining the distance between the RIS and the UE with sufficient accuracy to achieve, or obtain, the benefits of beam focusing over a beamforming operation that steers a beam towards a direction without focusing the beam at a specific distance (or focusing with an "infinite" focal length or focusing distance). Aspects disclosed herein may avoid issues associated with power fluctuations (e.g., due to changing channel conditions between a 'calibration' operation and a measurement operation). For example, a RSRP-based localization which compares the measured RSRP to a lookup table of pre-calculated or pre-measured power levels may suffer from power fluctuations due to a changing channel between generating the lookup table and measuring the RSRP. Accordingly, aspects disclosed herein are based on RSRP measurements corresponding to different RIS configurations (e.g., with different numbers of RIS elements used for beamforming) made during a short time period (e.g., a time period for which it may be assumed that each reference signal experiences similar channel conditions) to estimate a distance between a wireless device and the RIS as discussed herein. In some aspects discussed herein, the distance estimation may be based on relative RSRPs (e.g., an ordering of the measured RSRPs) for the different RIS configurations.

Figure 4:
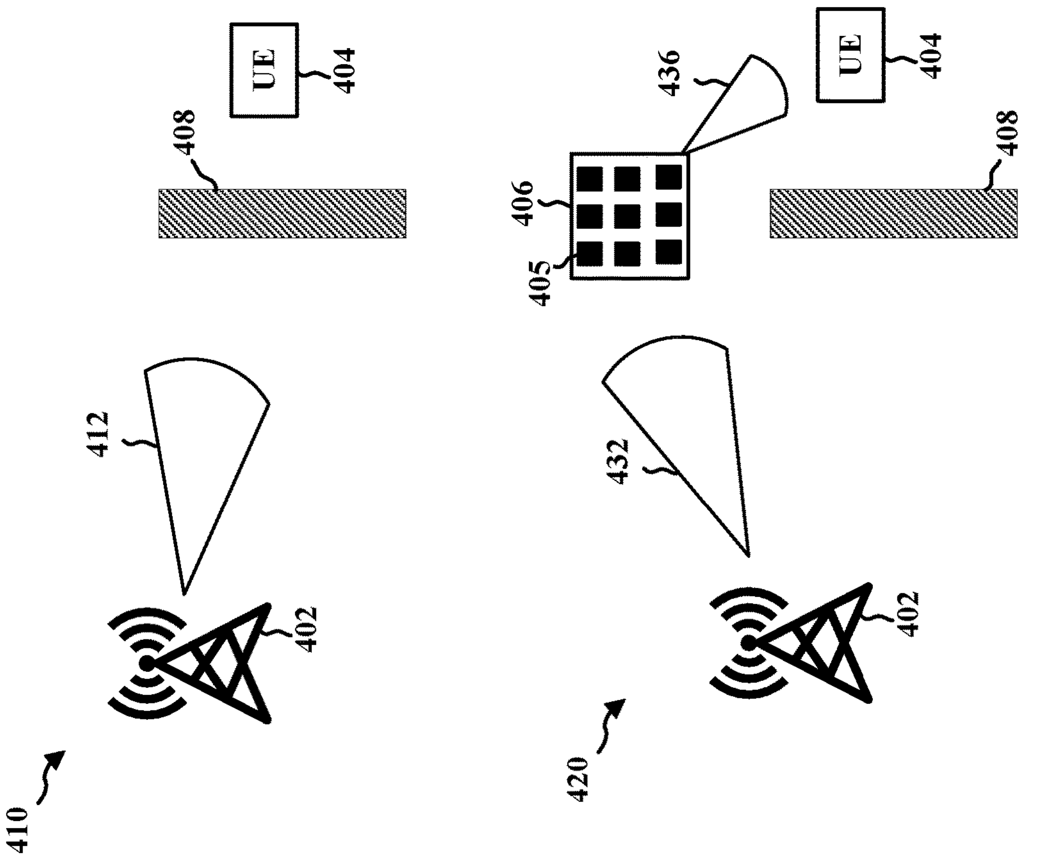
FIG. 4 is a set of diagrams illustrating a communication between a base station and a UE associated with a blockage without, and with, a RIS, in accordance with some aspects of the disclosure.

FIG. 4 is a set of diagrams 410 and 420 illustrating a communication between a base station 402 and a UE 404 associated with a blockage 408 without, and with, a RIS 406, in accordance with some aspects of the disclosure. In some aspects, the RIS 406 may include a large number of uniformly distributed electrically controllable elements (e.g., element 405 also referred to as a configurable element or a RIS element). Each element 405 may have a reconfigurable electromagnetic characteristic, e.g., a reflection coefficient. Depending on the combination of configured states of each element 405, the RIS 406 may reflect and modify the incident radio waveform in a controlled manner (e.g., by changing a reflected direction, changing a beam width, etc.). The RIS 406 may function as a near passive device, and the reflection direction may be controlled by the base station. The RIS 406 may reflect an impinging wave in a direction indicated by the base station to a UE.

A RIS (e.g., the RIS 406) may be deployed in wireless communication systems, including cellular systems, such as LTE, NR, etc. An RIS may alter the channel realization in a controlled manner, which may improve channel diversity. The increased diversity may provide robustness to channel blocking/fading, which may be of particular importance for mmWave communication. Compared to a wireless relay or repeater systems, an RIS may be more cost and energy efficient.

As illustrated in FIG. 4, a base station 402 may control the RIS 406 to extend beam coverage and/or to address blockages (e.g., blockage 408) between the base station 402 and the UE 404. Diagram 410 illustrates a blockage 408 that blocks the beam 412 from reception at the UE 404. As illustrated in diagram 420, the base station 402 may transmit communication for the UE 404 using a directional beam 432 (which may be referred to as the impinging beam) to the RIS 406 for reflection over a directional beam 436 to the UE 404. The base station 402 may indicate the directional beam 436 to the RIS 406, and the RIS 406 may reflect the impinging wave associated with directional beam 432 in the direction of the directional beam 436. The RIS 406 may adjust the reflection of the impinging directional beam 432 based on a set of coefficients (e.g., a phase matrix), <D, indicating a set of configured states (or phases) of the configurable elements (e.g., a state/phase for each element 405) of the RIS 406.

Figure 5:
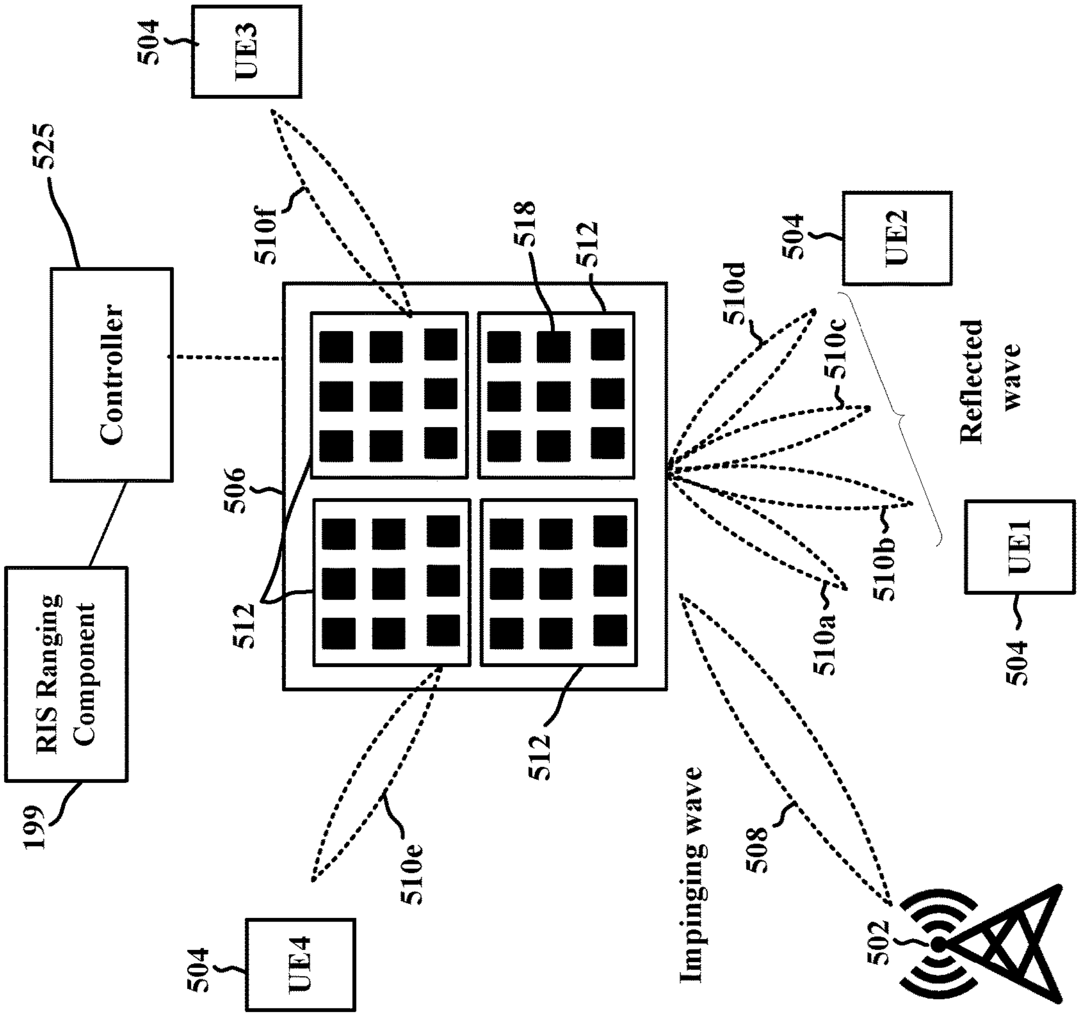
FIG. 5 illustrates an example in which the RIS includes multiple subsets of multiple RIS elements.

FIG. 5 illustrates an example in which the RIS 506 includes multiple subsets 512 of multiple RIS elements 518. As illustrated, different subsets 512 of RIS elements 518 may serve different UEs 504. Accordingly, the different subsets 512 of multiple RIS elements 518 may be configured differently to adjust the reflected direction, the beam width, or other characteristics of the impinging wave 508, and in some aspects, may each be considered as a separate/independent RIS. The RIS elements 518 may be controlled by a controller 525 (including a RIS ranging component 199 as illustrated in FIG. 1) at the RIS 506 based on control information received by the base station 502. As described in connection with FIG. 4, the base station 502 may indicate a beam direction (e.g., any of beam direction 510*a*, beam direction 510*b*, beam direction 510*c*, beam direction 510*d*, beam direction 510*e*, or beam direction 510*f*) to the RIS for reflecting beamformed communication received as the impinging wave 508 to a particular UE 504 in a particular direction. The RIS may similarly be controlled by a UE for reflecting communication from the UE to a base station and/or to another UE.

Figure 6:
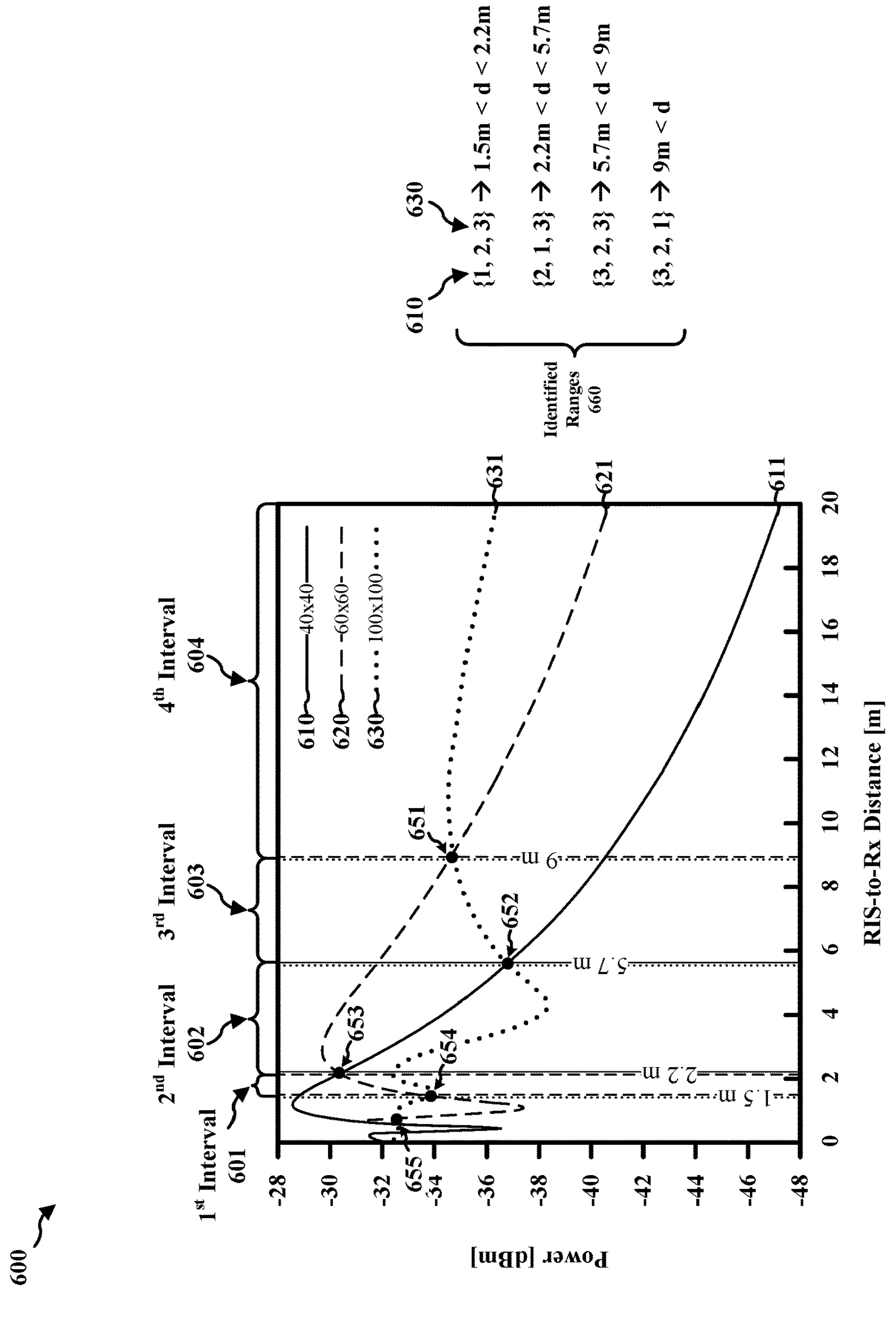
FIG. 6 is a diagram illustrating an RSRP-comparison based approach for estimating a distance between a RIS and a receiver in accordance with some aspects of the disclosure.

FIG. 6 is a diagram 600 illustrating an RSRP-comparison based approach for estimating a distance between a RIS and a receiver in accordance with some aspects of the disclosure. In some aspects, a base station (or RIS controller) may obtain a distance of the UE with reference to one or more thresholds and/or ranges by comparing a measured RSRP (at a receiver, such as a wireless device or UE) of a plurality of RS associated with beams formed by the RIS using different numbers of RIS elements (or element groups). In some aspects, as few as two RIS configurations may be used to derive information regarding a distance to a wireless device. Diagram 600 illustrates a set of characteristic power curves of power as a measure of distance for beamformed beams generated using different numbers of RIS elements.

In some aspects, the RSRP-comparison based approach disclosed herein utilizes the fact that the power associated with a beamformed beam (e.g., an RSRP measured by a wireless device) varies based on a distance from the RIS in a known, or calculable, manner for each particular RIS configuration (e.g., a RIS configuration using a particular number of RIS elements to perform a beamforming operation). For example, in the far field (e.g., which may be defined differently for different RIS configuration combinations, different RIS characteristics, or for different applications), using fewer RIS elements (e.g., a smaller number of RIS elements) to perform beamforming may be associated with less power (e.g., a lower RSRP value measured by a wireless device in the far field) when compared to a RIS configuration using more RIS elements (e.g., a larger number of RIS elements). However, in the near field (e.g., which, in some aspects, may be defined in contrast to the far field or as within a certain distance of the RS based on the RIS configuration combinations, the RIS characteristics, or the applications), using fewer RIS elements (e.g., a smaller number of RIS elements) to perform beamforming may be associated with higher power (e.g., a higher RSRP value measured by a wireless device in the near field) when compared to a RIS configuration using more RIS elements (e.g., a larger number of RIS elements). In some aspects, this may be due to smaller RIS surfaces leading to smaller phase error arising from the distance approximation based on the far-field assumption. In other words, the far field assumption, upon which beamforming, e.g., angle-only beam steering may be based in some aspects, may lead to phase error associated with a reduced power in a near field that is larger when larger arrays (e.g., larger numbers of RIS elements) are used for beamforming.

Because the number of RIS elements used to perform a beamforming operation affects the received power differently in the near- and far-field, a comparison of received power (e.g., an RSRP) between RIS configurations associated with different numbers of RIS elements may provide distance information. For example, diagram 600 illustrates a set of curves (e.g., curve 611, curve 621, and curve 631) for power as a function of distance for a corresponding set of RIS configurations (e.g., a first RIS configuration 610, a second RIS configuration 620, and a third RIS configuration 630, respectively) using different numbers of RIS elements (e.g., a 40×40 array (of 1600 elements), a 60×60 array (of 3600 elements), or a 100×100 array (of 10,000 elements), respectively) for a beamforming operation. In some aspects, it may be assumed that the beam formed using each of the RIS configurations 610, 620, and 630 are transmitted and/or received close in time (e.g., within a slot or a small number of slots) such that the different RSRPs are associated with a same set of channel characteristics. For example, close-in-time RS transmissions using different RIS configurations may avoid power fluctuations due to time-varying channel characteristics, e.g., small- and large-scale fading, as each power (or power curve) for a corresponding, close-in-time RS is expected to be affected similarly and the relative powers (e.g., an ordering of the powers at a particular distance) are expected to remain unchanged.

In some aspects, a set of curves similar to curves 611, 621, and 631, may be generated for, or associated with, each particular configuration of network elements for which the RSRP-comparison based approach discussed herein may be implemented. The particular configuration may include, e.g., a particular distance between the RIS and a transmitter, a particular set of elevation and azimuthal angles for incident/impinging and reflected signals/waves, an inter-element spacing associated with the configurable array of reflective elements, a size of the elements of the configurable array of reflective elements, and/or an associated frequency or wavelength for a communication associated with the RSRP-comparison based approach. In some aspects, free space path loss (FSPL) is assumed as any other path loss may be experienced by all beamformed beams equally such that the relative received powers remain unaffected. Accordingly, the set of curves including curves 611, 621, and 631 may be useful for demonstrating the underlying concept. For example, using two of the curves, e.g., curves 611 and 621 associated with RIS configurations 610 and 620, respectively, it may be determined (e.g., by one of a wireless device, a base station or a RIS controller) whether the wireless device is likely to be within, or beyond, a threshold distance of 2.2 m (e.g., a distance associated with a crossover point 653 at which a relative ordering of two power curves switches) based on the relative RSRP measured by the wireless device. For example, based on the power associated with the first RIS configuration 610 being one of greater than or less than the power associated with the second RIS configuration 620, it may be determined that the device is one of within 2.2 m of the RIS or beyond 2.2 m from the RIS, respectively.

Alternatively, or additionally, the pair of curves 611 and 631 may be associated with a threshold of 5.7 m based on the crossover point 652 or the pair of curves 621 and 631 may be associated with a threshold of 9 m based on the crossover point 651 (e.g., a first crossover point when approaching from the direction of positive infinity). The rationale for selecting the first crossover point when approaching from positive infinity is discussed below. The pair of curves 621 and 631, as an example, may be associated with additional crossover points, e.g., crossover point 654 and crossover point 655, closer to the RIS than crossover point 651 that may lead to ambiguity when comparing two RSRPs (or two curves/configurations). Using the example of the crossover points 651, 654, and 655, a higher RSRP measured for the third RIS configuration 630 than for the second RIS configuration 620 may be associated with a distance from the RIS of one of between 0.7 m and 1.5 m, or greater than 9 m, while a higher RSRP measured for the second RIS configuration 620 than for the third RIS configuration 630 may be associated with a distance from the RIS between 1.5 m and 9 m that may not be ambiguous if no additional crossover points are identified at a distance closer than 0.7 m. As illustrated by the example of the pair of curves 621 and 631, a relative ordering may be ambiguous and a single crossover point may be selected as the basis for a distance determination. For example, for the pair of curves 621 and 631, the crossover point 651 (e.g., the first crossover point when approaching from the direction of positive infinity) may be selected as the relevant threshold for a distance determination.

When using a larger number of configurations and/or curves, an ambiguity in the range associated with a particular ordering of a first RSRP associated with a first configuration and a second RSRP associated with a second configuration ambiguity may be avoided, or disambiguated, based on the position in the ordering of a third RSRP associated with a third configuration of a set of additional configurations. For example, for an RSRP-comparison based approach using the three RIS configurations 610, 620, and 630 (and/or curves 611, 621, and 631), for a first measured RSRP, e.g., $RSRP_{630}$, associated with the third RIS configuration 630 that is higher than a second measured RSRP, e.g., $RSRP_{620}$, associated with the second RIS configuration 620 that may be associated with a distance from the RIS of one of between 0.7 m and 1.5 m, or greater than 9 m, a third measured RSRP, e.g., $RSRP_{610}$, associated with the first configuration may be used to determine which range to use for a distance determination. Specifically, if the ordering of the measured RSRPs from highest to lowest is a first ordering $\{RSRP_{630}, RSRP_{620}, RSRP_{610}\}$, the distance may be determined to be greater than 9 m, while if the ordering of the measured RSRPs is a second ordering $\{RSRP_{610}, RSRP_{630}, RSRP_{620}\}$, the distance may be determined to be between 0.7 m and 1.5 m. For a given number, n, of different configurations or curves associated with an RSRP-comparison based approach, the maximum number of distinct ranges that may be selected for distance determination may be a total number of permutations of the n RSRP values (e.g., n!) (where a single distance range, e.g., a range covering farther distances, may be selected for each permutation if there is any ambiguity). In some aspects, this maximum limit may not be achieved as some permutations may not occur based on the shape of the different power curves.

The rationale for selecting a farther range, or a first crossover point when approaching from the direction of positive infinity to be associated with a maximum distance associated with a particular ordering of measured RSRPs, in some aspects, is based on the nature of the near-field (or a very-near-field). For example, in some aspects, the power curves may, in a very-near-field, e.g., within 0.1 m or 1 m, experience rapid (but relatively small) fluctuations as a wireless device moves away from the RIS. Accordingly, the relative ordering of powers in the very-near-field may, for one or more distance ranges or intervals, be the same as a relative ordering for a different range of distances in a near-, mid-, or far-field. For example, referring to diagram 600, while there may be distances less than 2.2 m for which the ordering of the RSRPs measured (from highest to lowest) for the RIS configurations 610, 620, and 630, e.g., $RSRP_{610}$, $RSRP_{620}$, and $RSRP_{630}$, respectively, may be $\{RSRP_{630}, RSRP_{620}, RSRP_{610}\}$(or $\{RSRP_{620}, RSRP_{630}, RSRP_{610}\}$) the distance may be determined to be in the fourth interval including distance greater than 9 m (or in the third interval between 5.7 m and 9 m) instead of an interval including distances less than 2.2 m. However, as all configurations of beamforming and/or beam focusing are expected to be associated with acceptable power of the reflected signal within the very-near-field, the RSRP-comparison based approach may ignore the possibility that the device is within a very-near-field and assume that the RSRP ordering is based on a position father than a very-near-field.

In some aspects, assuming that the RSRP ordering is associated with a farthest range in a set of ranges/intervals with a same RSRP ordering may result in an erroneous configuration for a distance estimation refinement operation and/or a beam focusing for communication between the transmitter (e.g., a base station) and the receive (e.g., the wireless device or UE). However, the erroneous configuration is likely to provide sufficient power in the very-near-field as discussed above. In the opposite case, in which a wireless device is at a distance from the RIS that is beyond the very-near-field (e.g., in a mid- or far-field) but the interval is identified as the interval in the very-near-field, the erroneous configuration is likely to provide very little power to the wireless device based on the rapid decrease in power over distance for beam focusing with a short focusing distance. Accordingly, the results of an incorrect distance determination based on assuming the farther range are generally benign, while the results of an incorrect distance determination based on assuming the closer range may be significant (e.g., failure of the wireless device to correctly receive beam focused signal).

Accordingly, a larger number of configurations and associated curves used for an RSRP-comparison based approach may allow a distance to be determined with greater granularity. For example, in diagram 600, if all three RIS configurations 610, 620, and 630 are used, it may be determined, e.g., based on a rank assigned to each configuration, whether the wireless device is likely to be closer than 1.5 m, in the first interval 601 between 1.5 and 2.2 m, in the second interval 602 between 2.2 and 5.7 m, in the third interval 603 between 5.7 and 9 m, or in the fourth interval 604 including distances greater than 9 m based on the set of identified ranges 660. As discussed above, in some aspects, a single set of unambiguous intervals may be used. For example, when using the three power curves (or configurations) illustrated in diagram 600, the set of intervals may be defined by the crossover points 651, 652, and 653, or the crossover points 651, 652, 653, and 654.

Figure 7:
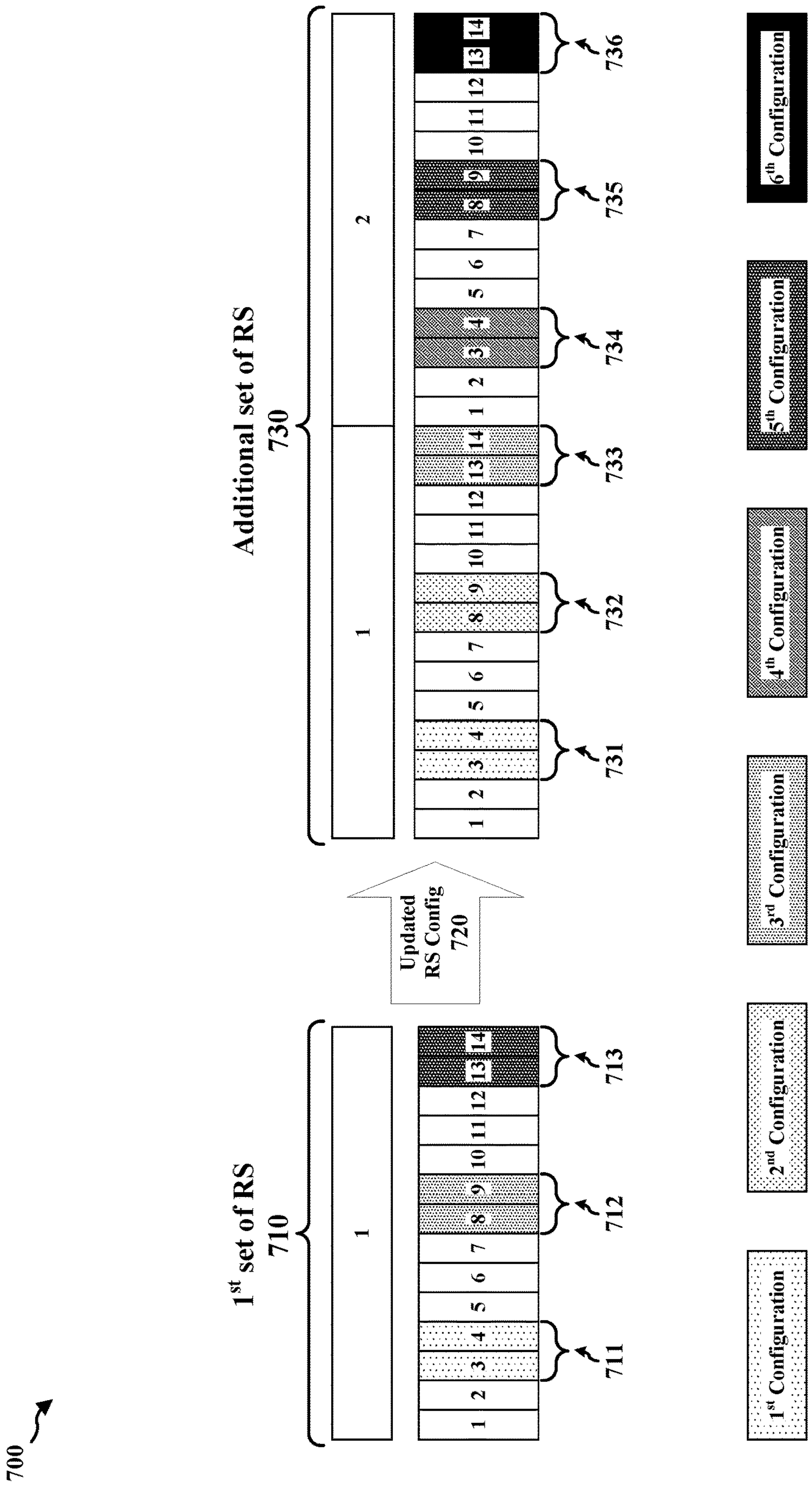
FIG. 7 is a diagram illustrating a configuration of a first set of reference signals for a first (coarse) distance estimation and an additional set of reference signals for a distance estimation refinement operation in accordance with some aspects of the disclosure.

FIG. 7 is a diagram 700 illustrating a configuration of a first set of reference signals for a first (coarse) distance estimation and an additional set of reference signals for a distance estimation refinement operation in accordance with some aspects of the disclosure. For example, a first set of reference signals 710 may include a set of symbols carrying a reference signal in a first slot. In some aspects, the set of symbols may include symbols 3, 4, 8, 9, 13, and 14, carrying CSI-RS (not requiring scheduling of additional distance-estimation RS) or may include symbols specifically configured to carry RS for distance estimation. In the context of FIG. 7 the transmitter transmitting the reference signals may be one of a network node, a network device, or a base station and may be referred to below as a base station. Similarly, a receiving device may be a wireless device or UE and may be referred to below as a UE.

The configuration of the first set of reference signals 710, in some aspects, may be associated with a first RIS configuration 711, a second RIS configuration 712, and a third RIS configuration 713. Each of the RIS configurations 711, 712, and 713 of the RIS, in some aspects, may be associated with a particular number of elements of the RIS to be used in a beamforming operation. In some aspects, the different configurations may additionally, or alternatively, be associated with varying one or more other characteristics of the RIS that produce known power curves that may be compared to identify a range of distances associated with a particular ordering of received powers (e.g., using a set of RIS configurations with different focusing distances for a beam focusing operation).

A UE (or other wireless device) may, or may not be aware of the configurations of the RIS associated with the different reference signals. If the UE is not aware of the configurations of the RIS associated with the different reference signals, the UE may be configured to provide (e.g., via a transmitted report) the RSRP measured for each of the reference signals (e.g., CSI-RS) or to provide an ordered list of the RS based on the RSRP that the base station or RIS controller may use to perform a distance determination. If the UE is aware of the configurations of the RIS associated with the different reference signals, the UE may provide the information listed above, or may be configured to estimate the distance and provide an indication of the estimated distance.

Based on the information provided by the UE regarding the measurements of the RSRP, a base station or RIS controller may determine an estimated distance from the RIS to the UE. The base station, or RIS controller, may then use the estimated distance to determine an updated RS configuration or a configuration for the RIS to use for a beam focusing operation associated with at least one subsequent transmission from the base station to the UE. For example, based on a report received regarding the reference signals associated with the RIS configurations 711, 712, and 713, the base station, or RIS controller, may generate an updated RS configuration 720 associated with an additional (second, or subsequent) set of reference signals 730. The additional set of reference signals 730 may be associated with a larger number of RIS configurations over a larger number of slots. The RIS configurations associated with the additional set of reference signals 730 may include a first RIS configuration 731, a second RIS configuration 732, a third RIS configuration 733, a fourth RIS configuration 734, a fifth RIS configuration 735, and a sixth RIS configuration 736, where the RIS configurations 731, 732, 733, 734, 735, and 736 may include all, some, or none, of the RIS configurations 711, 712, or 713 based on the result, e.g., the estimated distance, associated with the first set of reference signals 710. The RIS configurations 731-736 associated with the additional set of reference signals 730, in some aspects, may include a set of configurations selected specifically to provide refinement within a range of distances associated with the estimated distance.

In some aspects, the first set of reference signals 710, may include more than three RIS configurations. The set of configurations associated with the first set of reference signals 710, in some aspects, may be selected to provide a sufficient granularity of the distance estimation such that no additional set of reference signals is transmitted to refine a distance estimation based on the first set of reference signals 710. Accordingly, in some aspects, the base station, or RIS controller, may determine a focusing distance based on the measured powers (RSRPs) of the first set of reference signals 710. Such configurations may be referred to as single-pass distance estimation while a configuration using a first, coarse distance estimation followed by at least one distance estimation refinement may be referred to as a multi-pass distance estimation.

A gap between each group of symbols used for transmitting reference signals associated with different RIS configurations, in some aspects, may be selected to ensure that the RIS can reshape the beam using different numbers of elements (e.g., can be reconfigured between symbol groups. Accordingly, information indicating a minimum time for RIS reconfiguration to reshape the beam should be communicated between the RIS, e.g., a RIS controller, a base station before configuring the first set of reference signals 710 (e.g., during initial setup). As discussed above, the UE may then compute an RSRP for each RIS configuration (e.g., using different numbers of elements) using the corresponding symbols carrying reference signals (e.g., including CSI-RS resources) within all slots taking part in the distance estimation. Based on a target (e.g., a desired or configured) distance resolution, the number of consecutive symbols in a group and the number of such groups may vary. Accordingly, in some aspects, multiple slots may be used to perform the distance estimation using the RSRP-comparison based approach discussed herein. The number of slots, in some aspects, may be limited by the time over which it is reasonable to treat the channel, or the channel characteristics, as sufficiently non-varying. The UE may then compare RSRP measurements and obtain, or determine, estimated distance information locally (when aware of the RIS configurations associated with the reference signals). The determination may be prior to transmitting information regarding the measured RSRPs to the RIS controller or the base station. The UE may then transmit measurement information regarding the measured RSRPs (or the determined estimated distance) to the RIS controller or the base station, where the measurement information may include one or more of a first set of received signal powers associated with the plurality of reference signal transmissions, a second set of relative received signal powers associated with the plurality of reference signal transmissions, a distance estimate, or an estimated range of distances.

In another example, the base station may first configure two symbol groups with the CSI-RS resources to get a rough distance estimate as described in relation to using pairs of RIS configurations or curves in diagram 600. Based on the rough distance estimate, the base station may configure a set of optimized RIS configurations (e.g., associated with different numbers of RIS elements used for beamforming) to further improve, or refine, a distance resolution and an associated distance estimation. The use of such a multi-pass distance estimation may increase a time delay associated with estimating the distance, but may reduce or save transmit energy and time/freq resources associated with the reference signals.

Figure 8:
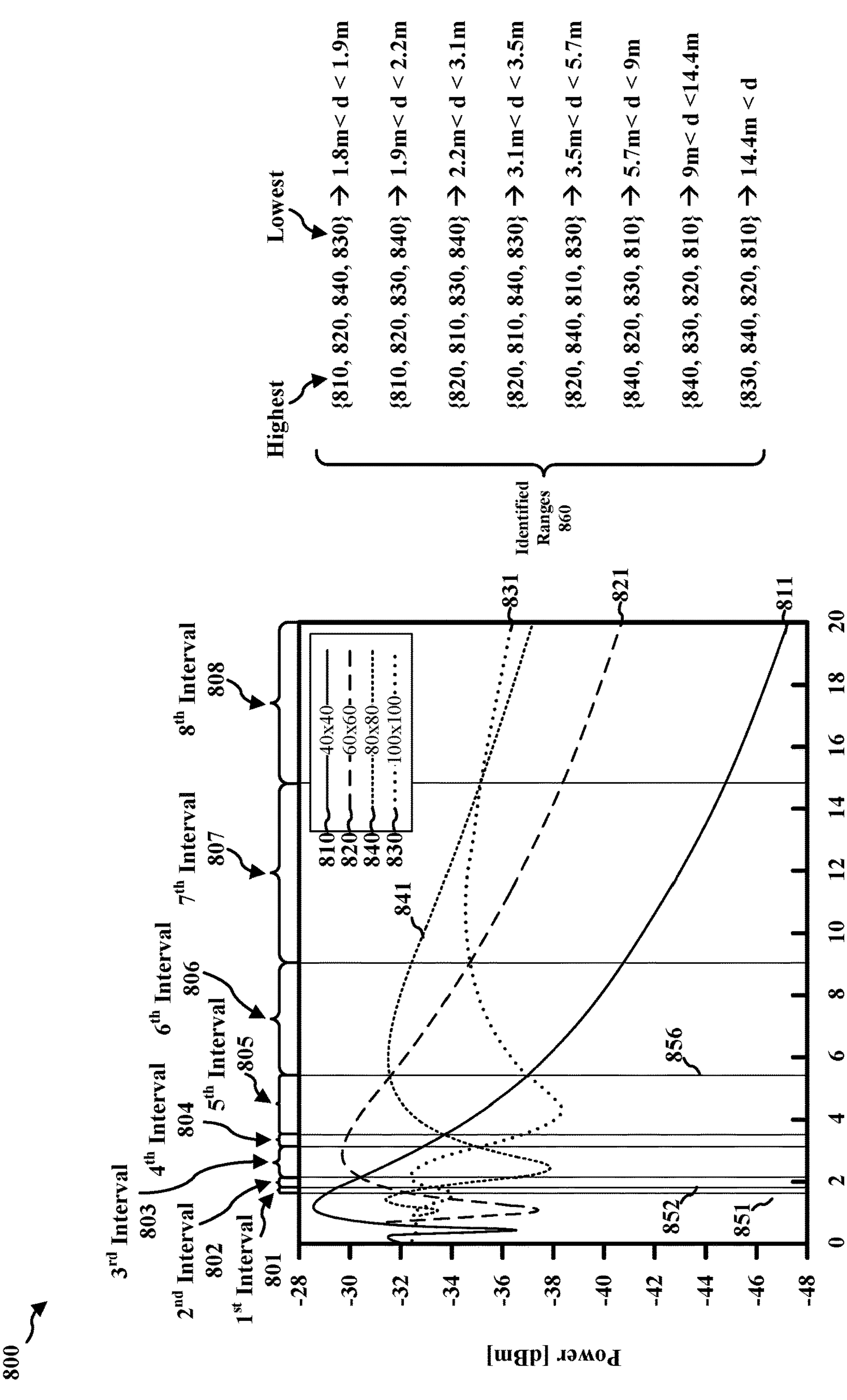
FIG. 8 is a diagram illustrating an RSRP-comparison based approach using a larger number of RIS configurations such as may be used in relation to one of the single-pass distance estimation or a multi-pass distance estimation in accordance with some aspects of the disclosure.

FIG. 8 is a diagram 800 illustrating an RSRP-comparison based approach using a larger number of RIS configurations such as may be used in relation to one of the single-pass distance estimation or a multi-pass distance estimation in accordance with some aspects of the disclosure. Similarly to diagram 600 of FIG. 6, diagram 800, illustrates a set of curves (e.g., curve 811, curve 821, curve 831, and curve 841) for power as a function of distance for a corresponding set of RIS configurations (e.g., a first RIS configuration 810, a second RIS configuration 820, a third RIS configuration 830, and a fourth RIS configuration 840, respectively) using different numbers of RIS elements (e.g., a 40×40 array (of 1,600 elements), a 60×60 array (of 3,600 elements), a 100×100 array (of 10,000 elements), or an 80×80 array (of 6,400 elements) respectively) for a beamforming operation. As discussed above in relation to FIGS. 6 and 7, in some aspects, it may be assumed that the beam formed using each of the RIS configurations 810, 820, 830, and 840 are transmitted and/or received close in time (e.g., within a slot or a small number of slots as illustrated for the sets of reference signals 710 and 730) such that the different RSRPs are associated with a same set of channel characteristics.

As discussed in relation to FIG. 6, the ordering of the RSRPs (the relative power associated with each reference signal and/or configuration) may identify an interval for an estimated distance between the RIS and the wireless device measuring the power. For simplicity and clarity, diagram 800 adds one additional RIS configuration, e.g., the fourth RIS configuration 840, and may be used to identify at least the eight intervals illustrated, e.g., first interval 801, second interval 802, third interval 803, fourth interval 804, fifth interval 805, sixth interval 806, seventh interval 807, or eighth interval 808. Accordingly, based on the ordering of the RSRPs, it may be determined whether the wireless device is likely to be closer than 1.8 m, between 1.8 and 1.9 m, between 1.9 and 2.2 m, between 2.2 and 3.1 m, between 3.1 and 3.5 m, between 3.5 and 5.7 m, between 5.7 and 9 m, between 9 and 14.4 m, or farther than 14.4 m based on the set of identified ranges 860. As discussed above, the intervals may be associated with crossover points such as crossover point 851, crossover point 852, and crossover point 856 that may be selected to identify a farthest range associated with a particular ordering of measured RSRPs for the different RIS configurations. As illustrated for crossover point 856, in some aspects using additional RIS configurations and/or curves, crossover points associated with different pairs of curves may occur at approximately the same distance, thus reducing the number of distinct intervals defined away from the very-near-field. It can be seen in diagram 800 that, in some aspects, comparing all the RSRP measurements (and considering their relative order) may lead to a better distance resolution than just looking at the best RSRP. For example, the fourth RIS configuration 840 may be associated with a highest RSRP in an interval between 5.7 m and 14.4 m, but by comparing the relative power associated with RIS configurations 820 and 830 that range may be broken into a first range between 5.7 m and 9 m and a second range between 9 m and 14.4 m thus reducing the uncertainty in the distance estimation from ~9 m to ~4.5 m or to ~5.5 m. Accordingly, by adding the fourth RIS configuration 840 the resolution of the distance estimation may be extended out to around 15 m (from ~9 m) and may improve the resolution to as little as 10 cm for close UEs (e.g., within 2 m) or by breaking up intervals defined by the RIS configurations 810, 820, and 830, into subintervals (e.g., the second interval 602 may be broken into the third interval 803, fourth interval 804, and fifth interval 805, while the fourth interval 604 may be broken up into the seventh interval 807 and eighth interval 808).

Although some resolution intervals as illustrated may not provide as high a resolution as some sophisticated positioning algorithms, the RSRP-comparison based approach, in some aspects, may be (more) practical to implement and may not use additional spectral resources (i.e., compared to positioning algorithms that may be associated with additional positioning reference signal sets). Accordingly, the RSRP-comparison based approach may therefore be useful for the base station, and may specifically be useful for beam focusing at the RIS (i.e., using angle, or direction, and distance information associated with a UE to improve the received power at the UE). As described above, in some aspects, a base station may configure the RIS during CSI-RS transmission with different numbers of elements to use to apply beamforming (e.g., angle-only beam steering), obtain the rough distance from the RIS to the UE, and then may apply beam focusing (e.g., by (re)configuring the RIS) for data transmission mode (e.g., to boost throughput). In some aspects, the UE may request a base station to configure more symbol groups (e.g., of an appropriate size selected by the base station) to improve distance resolution for use at the UE even if the base station determines that a current distance estimation may be sufficient for operations at the base station.

Figure 9:
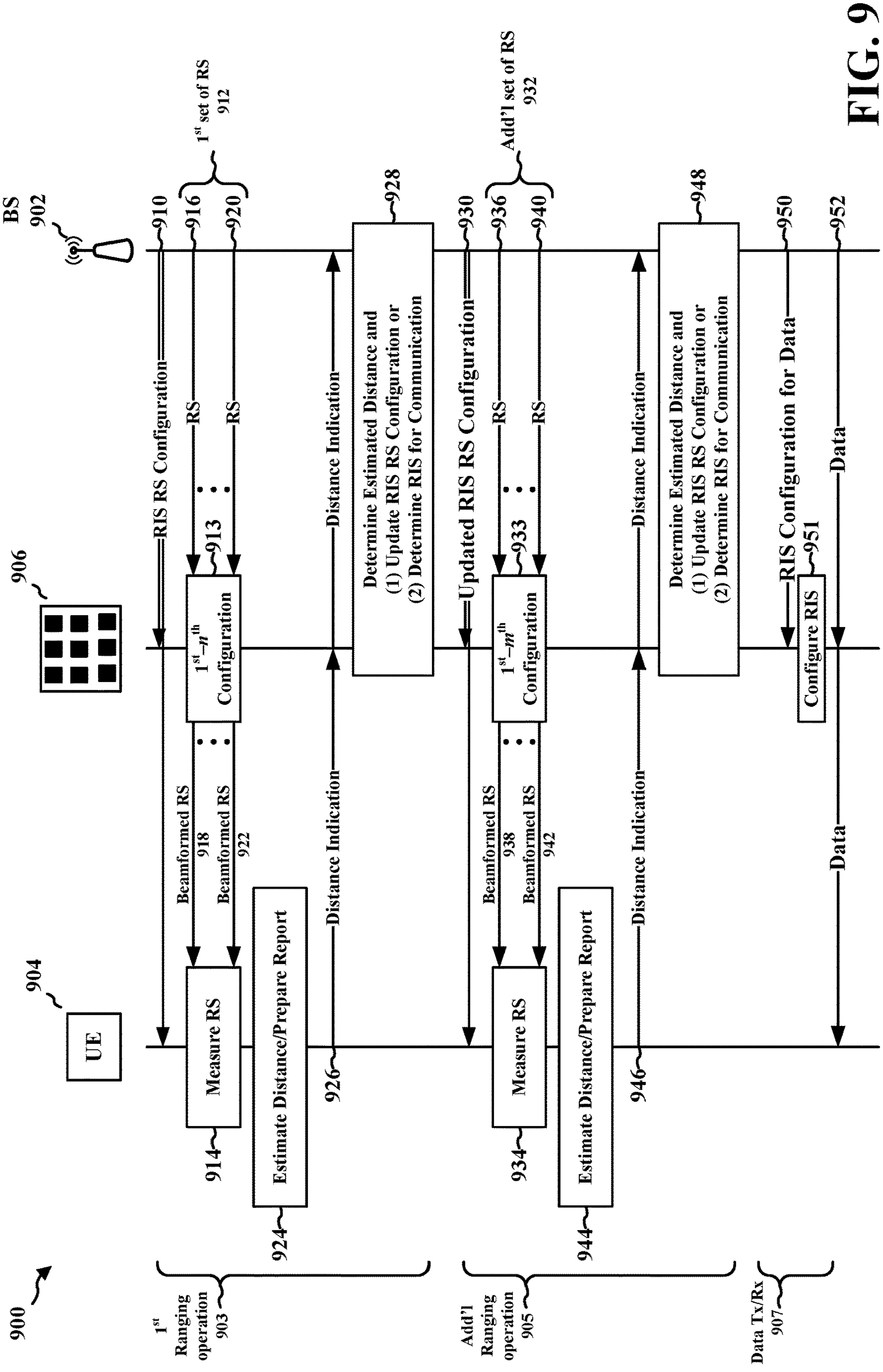
FIG. 9 is a call flow diagram illustrating an RSRP-comparison based approach in accordance with some aspects of the disclosure.

FIG. 9 is a call flow diagram 900 illustrating an RSRP-comparison based approach in accordance with some aspects of the disclosure. Call flow diagram 900 illustrates a base station 902 as an example of a network node or network device (which may perform operations that, in other configurations, may be performed by a RIS controller) in communication with a UE 904 via a RIS 906. In some aspects, the RIS 906 may be a network device integrating a RIS controller and an array of reconfigurable reflective elements often referred to as a RIS. The base station 902 may transmit, and the UE 904 and the RIS 906 (or a RIS controller associated with the RIS 906) may receive, a RIS RS configuration 910 indicating a set of reference signals and a corresponding set of RIS configurations as discussed in relation to FIGS. 6-8 above. Based on the RIS RS configuration 910, the base station may transmit a first set of reference signals 912 including RS 916 and 920. In association with each RS in the first set of reference signals 912 (e.g., a set of n reference signals including RS 916 and RS 920), the RIS 906 may be configured according to a corresponding RIS configuration in a set of RIS configurations 913 (e.g., a set of n RIS configurations 913 including a first to an $n^{th}$ configuration) to beamform the reference signals in the first set of reference signals 912 (e.g., to produce a corresponding set of beamformed reference signals, such as beamformed RS 918 and beamformed RS 922). The set of n RIS configurations 913, in some aspects, may include any of the RIS configurations 610, 620, 630, 711, 712, 713, 810, 820, 830, or 840 or additional RIS configurations using different numbers of RIS elements based on the characteristics of the RIS 906.

The UE 904 may receive the beamformed reference signals associated with the first set of reference signals 912, e.g., beamformed RS 918 and beamformed RS 922, and may measure, at 914, a power (e.g., an RSRP) associated with the received beamformed reference signals. Based on the beamformed reference signals measured at 914, the UE 904, in some aspects, may, at 924, estimate the distance to the RIS 906 and/or prepare a report for transmission to the base station 902 (*or* a RIS controller associated with the RIS 906). The UE 904 may transmit a distance indication 926 to the base station 902 via the RIS 906. The distance indication 926, in some aspects, may be in the form of a first set of received signal powers associated with the set of reference signals 912 (that the RIS controller of base station 902 may use to order the received signal powers to perform the RSRP-comparison based approach), a second set of relative received signal powers associated with the set of reference signals 912 (e.g. an ordered list as illustrated in association with the set of identified ranges 860), a ranking of the reference signals based on an associated received signal powers (e.g. a ranking associated with each RIS configuration as illustrated in association with the set of identified ranges 660), a distance estimate, or an estimated range of distances. The base station (or the RIS 906 or RIS controller), at 928, may determine, based on the distance indication 926, an estimated distance associated with a first ranging operation 903. In some aspects, the distance indication 926 may also include an indication (or request) for the base station to configure an additional ranging operation 905. The base station 902 (or the RIS 906), at 928, may also determine an updated RIS RS configuration for an additional ranging operation 905 or determine, based on the estimated distance, a RIS configuration for beam focusing a communication between the base station 902 and the UE 904 via the RIS 906.

If the base station determines, at 928, an updated RIS RS configuration for an additional ranging operation 905, the base station (and the UE 904 an the RIS 906) may perform the additional ranging operation 905 similar to the first ranging operation 903. For example, the base station 902 may transmit, and the UE 904 and the RIS 906 may receive, an updated RIS RS configuration 930 indicating a set of reference signals and a corresponding set of RIS configurations for refining a distance estimation associated with the first ranging operation as discussed in relation to FIGS. 6-8 above. Based on the updated RIS RS configuration 930, the base station may transmit an additional set of reference signals 932 including RS 936 and 940. In association with each RS in the additional set of reference signals 932 (e.g., a set of m reference signals including RS 936 and RS 940), the RIS 906 may be configured according to a corresponding RIS configuration in a set of RIS configurations 933 (e.g., a set of m RIS configurations including a first to an $m^{th}$ configuration) to beamform the reference signals in the additional set of reference signals 932 (e.g., to produce a corresponding set of beamformed reference signals, such as beamformed RS 938 and beamformed RS 942). The set of m RIS configurations 933, in some aspects, may include any of the RIS configurations 610, 620, 630, 731, 732, 733, 734, 735, 736, 810, 820, 830, or 840 or additional RIS configurations using different numbers of RIS elements based on the characteristics of the RIS 906 and the results of the first ranging operation 903.

The UE 904 may receive the beamformed reference signals associated with the additional set of reference signals 932, e.g., beamformed RS 938 and beamformed RS 942, and may measure, at 934, a power (e.g., an RSRP) associated with the received beamformed reference signals. Based on the beamformed reference signals measured at 934, the UE 904, in some aspects, may, at 944, estimate the distance to the RIS 906 or prepare a report for transmission to the base station (or a RIS controller associated with the RIS 906). The UE 904 may transmit a distance indication 946 to the base station 902 via the RIS 906. The distance indication 946, in some aspects, may be in the form of a first set of received signal powers associated with the set of reference signals 932, a second set of relative received signal powers associated with the set of reference signals 932, a distance estimate, or an estimated range of distances. The base station 902 (or the RIS 906), at 948, may determine, based on the distance indication 946, an estimated distance associated with a first ranging operation 903. The base station 902 (or the RIS 906), at 948, may also determine an updated RIS RS configuration for an additional ranging operation 905 or determine, based on the estimated distance, a RIS configuration for beam focusing a communication between the base station 902 and the UE 904 via the RIS 906.

If the base station 902 determines, at 948, an updated RIS RS configuration for another additional ranging operation similar to additional ranging operation 905, the base station 902 (and the UE 904 an the RIS 906) may perform another additional ranging operation (not shown) similar to the first ranging operation 903 and the additional ranging operation 905 to further refine the distance estimation associated with the ranging operations 903 and 905 as discussed in relation to FIGS. 6-8 above. Once the distance estimation is sufficiently refined, e.g., as determined by one, or both, of the base station 902 (or RIS controller associated with the RIS 906) and/or the UE 904, the base station (or RIS controller) may determine at 948, the RIS configuration for beam shaping a communication between the base station 902 and the UE 904 via the RIS 906 as part of a data transmission operation 907.

The base station may transmit, and the RIS 906 (or a controller associated with the RIS 906) and the UE 904 may receive (e.g., in order to determine a transmission beam direction), RIS configuration 950 to configure the RIS 906 for beam shaping (e.g., beam focusing associated with steering a beam towards a direction and also focusing the beam at a specific distance based on the distance determined at 928 or 948, or beamforming associated with steering a beam in a particular direction without an associated focusing distance and/or location) a communication from the base station 902 to the UE 904. Based on the RIS configuration 950, the RIS (e.g., the RIS controller of the RIS 906) may, at 951, configure the RIS (e.g., a configurable array of reflective elements) to perform the indicated beam shaping operation. The base station 902 may then transmit, the RIS 906 may beam focus, and UE 904 may receive data 952.

Figure 10:
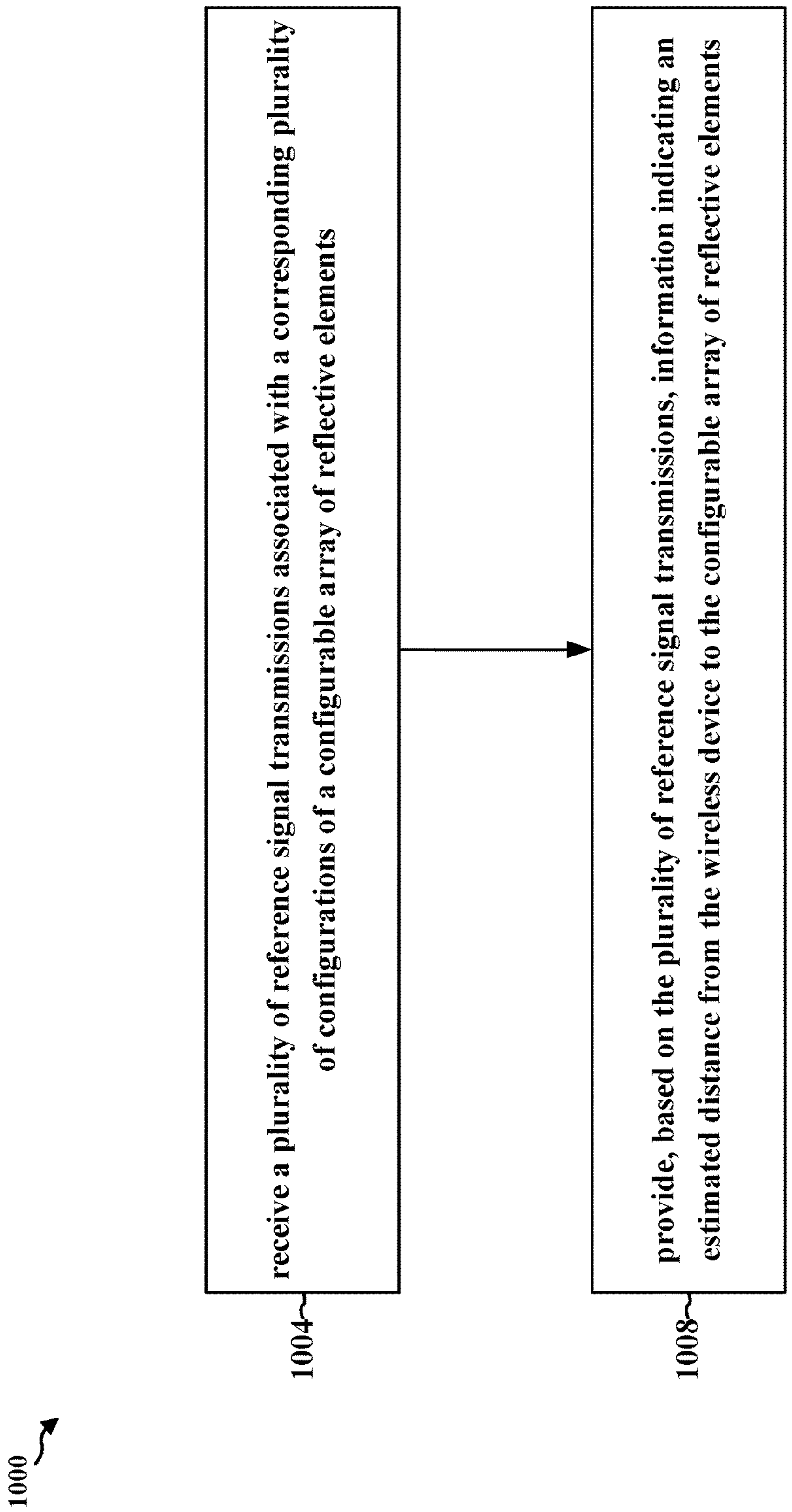
FIG. 10 is a flowchart of a method of wireless communication, in accordance with various aspects of the present disclosure.

FIG. 10 is a flowchart 1000 of a method of wireless communication. The method may be performed by a UE or other wireless device (e.g., the UE 104 or 904; the apparatus 1504). In some aspects, the UE may receive configuration information relating to a plurality of reference signal transmissions associated with a corresponding plurality of configurations of a configurable array of reflective elements (e.g., a RIS). In some aspects, the configuration information indicates resources associated with each reference signal transmission in the plurality of reference signal transmissions and a corresponding configuration in the corresponding plurality of configurations. For example, referring to FIGS. 6-9, the UE 904 may receive RIS RS configuration 910 indicating a configuration of a set of RS resources (e.g., for the first set of reference signals 710 or 912) and a corresponding set of RIS configurations (e.g., RIS configurations 610, 620, 630, 711, 712, 713, 810, 820, 830, or 840).

At 1004, the UE may receive a plurality of reference signal transmissions associated with a corresponding plurality of configurations of a configurable array of reflective elements. For example, 1004 may be performed by application processor 1506, cellular baseband processor 1524, transceiver(s) 1522, antenna(s) 1580, and/or RIS ranging component 198 of FIG. 15. As discussed above, the plurality of received reference signal transmissions may include reference signal transmissions beamformed by the RIS according to the corresponding plurality of configurations of the RIS. For example, referring to FIGS. 6-9, the UE 904 may receive beamformed RS 918 or 922 based on the set of n RIS configurations 913 (e.g., RIS configurations 610, 620, 630, 711, 712, 713, 810, 820, 830, or 840).

In some aspects, the UE may measure a received signal power for each of the plurality of reference signal transmissions. In some aspects, the receive signal power may be an RSRP. Measuring the received signal power, in some aspects, incudes comparing the received power of each reference signals associated with an iteration of the RSRP-comparison based approach for distance estimation to produce an ordered list of reference signals based on the measured power as illustrated in association with set of identified ranges 860 (or to rank each RS relative to other RS in the plurality of received reference signals as illustrated in association with set of identified ranges 660). For example, referring to FIGS. 6-9, the UE 904 may, at 914, measure a received power, e.g., an RSRP, for each reflected (and beamformed) reference signal associated with the set of reference signals 912 (e.g., including the received beamformed RS 918 and 922) and associate it with a corresponding RIS configuration in the plurality of RIS configurations (e.g., RIS configurations 610, 620, 630, 711, 712, 713, 810, 820, 830, or 840).

At 1008, the UE may provide, based on the plurality of reference signal transmissions, information indicating an estimated distance from the wireless device to the configurable array of reflective elements. For example, 1008 may be performed by application processor 1506, cellular baseband processor 1524, transceiver(s) 1522, antenna(s) 1580, and/or RIS ranging component 198 of FIG. 15. In some aspects, the information related to the estimated distance includes measurement information based on measuring the received signal power for each of the plurality of reference signal transmissions. Providing, at 1008, the information related to the estimated distance, in some aspects, may include transmitting the measurement information to at least one of a base station, a network node, or a controller of the configurable array of reflective elements (e.g., a RIS controller). In some aspects, the measurement information may include one or more of a first indication of a first set of received signal powers based on the received signal power measured for each of the plurality of reference signal transmissions, a second indication of a second set of relative received signal powers based on the received signal power measured for each of the plurality of reference signal transmissions, a distance estimate, or a third indication of an estimated range of distances. In some aspects, at least one of measuring the received signal power or providing the information related to the estimated distance at 1008 may include performing a distance estimation based on known intervals and or crossover points associated with the corresponding plurality of configurations of the RIS used to provide (e.g., beamform) the reference signals. For example, the distance estimate or the third indication of the range of distances, in some aspects, may be based on at least one of the first set of received signal powers or the second set of relative received signal powers (or ranked reference signals). For example, referring to FIGS. 6, 8, and 9, the UE 904 may, at 924, estimate the distance to the RIS 906 and/or prepare a report for transmission to the base station 902 (or a RIS controller associated with the RIS 906) based on received signal powers measured at 924 (and an associated set of identified ranges 660 or 860), and may transmit a distance indication 926.

In some aspects, based on the information provided to the base station (or RIS controller), the UE may receive second configuration information relating to a second plurality of reference signal transmissions associated with a second corresponding plurality of configurations of the RIS. Similar to the first configuration information described above, in some aspects, the second configuration information may indicate resources associated with each reference signal transmission in the second plurality of reference signal transmissions and a corresponding configuration in the second corresponding plurality of configurations. For example, referring to FIGS. 6-9, the UE 904 may receive the updated RIS RS configuration 930 indicating a configuration of a set of RS resources (e.g., for the additional set of reference signals 730 or 932) and a corresponding set of RIS configurations (e.g., RIS configurations 610, 620, 630, 731, 732, 733, 734, 735, 736, 810, 820, 830, or 840). In some aspects, the UE may receive at least one signal (or transmission) via the configurable array of reflective elements in a (data transmission) configuration based on the information indicating the estimated distance. In some aspects, e.g., as discussed in relations to FIGS. 7-9, before receiving the at least one signal (or transmission), additional iterations of the operations discussed above may be performed to refine the distance estimation (e.g., to identify the distance with greater accuracy or to narrow an estimated range to less than a threshold value for a width of a range) and the (data transmission) configuration may further be based on the additional iterations.

Figure 11:
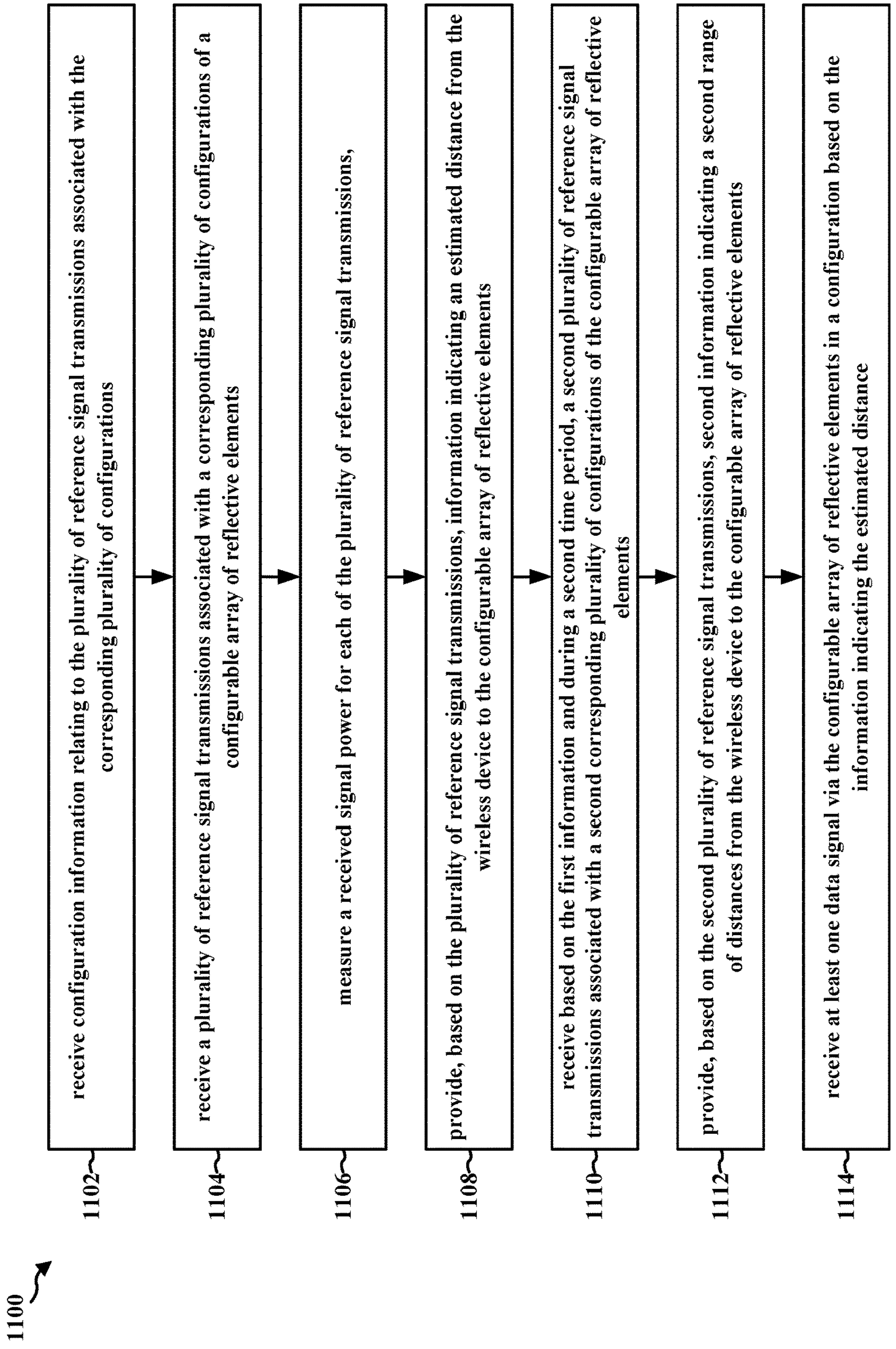
FIG. 11 is a flowchart of a method of wireless communication, in accordance with various aspects of the present disclosure.

FIG. 11 is a flowchart 1100 of a method of wireless communication. The method may be performed by a UE or other wireless device (e.g., the UE 104 or 904; the apparatus 1504). At 1102, the UE may receive configuration information relating to a plurality of reference signal transmissions associated with a corresponding plurality of configurations of a configurable array of reflective elements (e.g., a RIS). For example, 1102 may be performed by application processor 1506, cellular baseband processor 1524, transceiver(s) 1522, antenna(s) 1580, and/or RIS ranging component 198 of FIG. 15. In some aspects, the configuration information indicates resources associated with each reference signal transmission in the plurality of reference signal transmissions and a corresponding configuration in the corresponding plurality of configurations. In some aspects, the RIS configurations may be transparent to the UE, such that received signal power values measured as described below in relation to a measuring at 1106 may be reported as discussed in relation to providing information at 1108 below based on other identifiers of the RS, or RS resources, indicated in the configuration information. For example, referring to FIGS. 6-9, the UE 904 may receive RIS RS configuration 910 indicating a configuration of a set of RS resources (e.g., for the first set of reference signals 710 or 912) and a corresponding set of RIS configurations (e.g., RIS configurations 610, 620, 630, 711, 712, 713, 810, 820, 830, or 840).

At 1104, the UE may receive a plurality of reference signal transmissions associated with a corresponding plurality of configurations of a configurable array of reflective elements. For example, 1104 may be performed by application processor 1506, cellular baseband processor 1524, transceiver(s) 1522, antenna(s) 1580, and/or RIS ranging component 198 of FIG. 15. As discussed above, the plurality of received reference signal transmissions may include reference signal transmissions beamformed by the RIS according to the corresponding plurality of configurations of the RIS. For example, referring to FIGS. 6-9, the UE 904 may receive beamformed RS 918 or 922 based on the set of n RIS configurations 913 (e.g., RIS configurations 610, 620, 630, 711, 712, 713, 810, 820, 830, or 840).

At 1106, the UE may measure a received signal power for each of the plurality of reference signal transmissions. For example, 1106 may be performed by application processor 1506, cellular baseband processor 1524, transceiver(s) 1522, antenna(s) 1580, and/or RIS ranging component 198 of FIG. 15. In some aspects, the received signal power measured at 1106 may be an RSRP. Measuring the received signal power, in some aspects, incudes comparing the received power of each reference signals associated with an iteration of the RSRP-comparison based approach for distance estimation to produce an ordered list of reference signals based on the measured power as illustrated in association with set of identified ranges 860 (or to rank each RS relative to other RS in the plurality of received reference signals as illustrated in association with set of identified ranges 660). For example, referring to FIGS. 6-9, the UE 904 may, at 914, measure a received power, e.g., an RSRP, for each reflected (and beamformed) reference signal associated with the set of reference signals 912 (e.g., including the received beamformed RS 918 and 922) and associate it with a corresponding RIS configuration in the plurality of RIS configurations (e.g., RIS configurations 610, 620, 630, 711, 712, 713, 810, 820, 830, or 840).

At 1108, the UE may provide, based on the plurality of reference signal transmissions, information indicating an estimated distance from the wireless device to the configurable array of reflective elements. For example, 1108 may be performed by application processor 1506, cellular baseband processor 1524, transceiver(s) 1522, antenna(s) 1580, and/or RIS ranging component 198 of FIG. 15. In some aspects, the information related to the estimated distance includes measurement information based on measuring the received signal power for each of the plurality of reference signal transmissions at 1106. Providing, at 1108, the information related to the estimated distance, in some aspects, may include transmitting the measurement information to at least one of a base station, a network node, or a controller of the configurable array of reflective elements (e.g., a RIS controller). In some aspects, the measurement information may include one or more of a first indication of a first set of received signal powers based on the received signal power measured for each of the plurality of reference signal transmissions, a second indication of a second set of relative received signal powers based on the received signal power measured for each of the plurality of reference signal transmissions, a distance estimate, or a third indication of an estimated range of distances. In some aspects, at least one of measuring the received signal power at 1106 or providing the information related to the estimated distance at 1108 may include performing a distance estimation based on known intervals and or crossover points associated with the corresponding plurality of configurations of the RIS used to provide (e.g., beamform) the reference signals. For example, the distance estimate or the third indication of the range of distances, in some aspects, may be based on at least one of the first set of received signal powers or the second set of relative received signal powers (or ranked reference signals). For example, referring to FIGS. 6-9, the UE 904 may, at 924, estimate the distance to the RIS 906 and/or prepare a report for transmission to the base station 902 (or a RIS controller associated with the RIS 906) based on received signal powers measured at 924, and may transmit a distance indication 926.

In some aspects, based on the information provided to the base station (or RIS controller), the UE may receive second configuration information relating to a second plurality of reference signal transmissions associated with a second corresponding plurality of configurations of the RIS. Similar to the first configuration information described above, in some aspects, the second configuration information may indicate resources associated with each reference signal transmission in the second plurality of reference signal transmissions and a corresponding configuration in the second corresponding plurality of configurations. For example, referring to FIGS. 6-9, the UE 904 may receive the updated RIS RS configuration 930 indicating a configuration of a set of RS resources (e.g., for the additional set of reference signals 730 or 932) and a corresponding set of RIS configurations (e.g., RIS configurations 610, 620, 630, 731, 732, 733, 734, 735, 736, 810, 820, 830, or 840).

At 1110, the UE may receive, based on the first information and during a second time period, the second plurality of reference signal transmissions associated with the second corresponding plurality of configurations of the configurable array of reflective elements. For example, 1110 may be performed by application processor 1506, cellular baseband processor 1524, transceiver(s) 1522, antenna(s) 1580, and/or RIS ranging component 198 of FIG. 15. As discussed above, the plurality of received reference signal transmissions may include reference signal transmissions beamformed by the RIS according to the corresponding plurality of configurations of the RIS. For example, referring to FIGS. 6-9, the UE 904 may receive beamformed RS 938 or 942 based on the set of m RIS configurations 933 (e.g., RIS configurations 610, 620, 630, 731, 732, 733, 734, 735, 736, 810, 820, 830, or 840). In some aspects, the UE may measure a received signal power for each of the second plurality of reference signal transmissions as described above in relation to the measurement of the first plurality of reference signal transmission. For example, referring to FIGS. 6-9, the UE 904 may, at 934, measure a received power, e.g., an RSRP, for each reflected (and beamformed) reference signals associated with the additional set of reference signals 932 (e.g., including the received beamformed RS 938 and 942) and associate it with a corresponding RIS configuration in the second corresponding plurality of RIS configurations (e.g., RIS configurations 610, 620, 630, 731, 732, 733, 734, 735, 736, 810, 820, 830, or 840).

At 1112, the UE may provide, based on the second plurality of reference signal transmissions, second information indicating a second range of distances from the wireless device to the configurable array of reflective elements. For example, 1112 may be performed by application processor 1506, cellular baseband processor 1524, transceiver(s) 1522, antenna(s) 1580, and/or RIS ranging component 198 of FIG. 15. In some aspects, the second information may be in a same format, or include the same information, as the information related to the estimated distance provided at 1108. The second information, in some aspects, may also be provided, or transmitted, to the same entity or entities as were provided the information at 1108. In some aspects, the second range of distances may be included in, and narrower than, the first range of distances. For example, if a first set of reference signals identified an estimated distance in a range of 2.2 m to 5.7 m, a second set of RIS configurations including at least RIS configurations 810, 830, and 840 may be used to refine the distance range to be one of the range of 2.2 m to 3.1 m, 3.1 m to 3.5 m, or 3.5 m to 5.7 m. For example, referring to FIG. 9, the UE 904 may, at 944, estimate the distance to the RIS 906 and/or prepare a report for transmission to the base station 902 (or a RIS controller associated with the RIS 906) based on received signal powers measured at 944, and may transmit a distance indication 946. In some aspects, the first plurality of reference signal transmissions may be sufficient for a particular application and the second plurality of reference signals may be omitted.

At 1114, the UE may receive at least one signal via the configurable array of reflective elements in a (data transmission) configuration based on the information indicating the estimated distance. For example, 1114 may be performed by application processor 1506, cellular baseband processor 1524, transceiver(s) 1522, antenna(s) 1580, and/or RIS ranging component 198 of FIG. 15. In some aspects, the (data transmission) configuration based on the information indicating the estimated distance may further be based on the second information indicating the second range of distances from the wireless device to the RIS. For example, referring to FIG. 9, the UE 904 may receive the data 952 based on the RIS configuration 950 used to configure the RIS 906 for beam focusing a communication from the base station 902 to the UE 904.

The configuration associated with receiving the at least one signal at 1114, in some aspects, may be one of a first configuration in the corresponding plurality of configurations of the configurable array of reflective elements or a second configuration that is not in the corresponding plurality of configurations of the configurable array of reflective elements. For example, a configuration that is not included in the first (or second) corresponding pluralities of configurations may be used when the RIS shapes a reference signal beam (e.g., where shaping a beam may refer to either beamforming and beam focusing) using one type of beam shaping, e.g., beamforming or beam focusing, and the subsequent transmission, e.g., a data or control transmission, is associated with a different type of beam shaping, e.g., beam focusing or beamforming, respectively. Additionally, even when the RIS shapes a reference signal beam using a same type of beam shaping, e.g., beamforming or beam focusing, as used for the subsequent transmission, the corresponding first (or second) pluralities of configurations may not include a particular configuration optimized for the distance estimated as discussed above, and a different configuration not included in the corresponding first (or second) pluralities of configurations may be used for the subsequent transmission. Alternatively, or additionally, when the RIS shapes a reference signal beam using a same type of beam shaping, e.g., beamforming or beam focusing, as used for the subsequent transmission, the corresponding first (or second) pluralities of configurations may include a particular configuration optimized for the distance estimated as discussed above, and that particular configuration may be used for the subsequent transmission.

Figure 12:
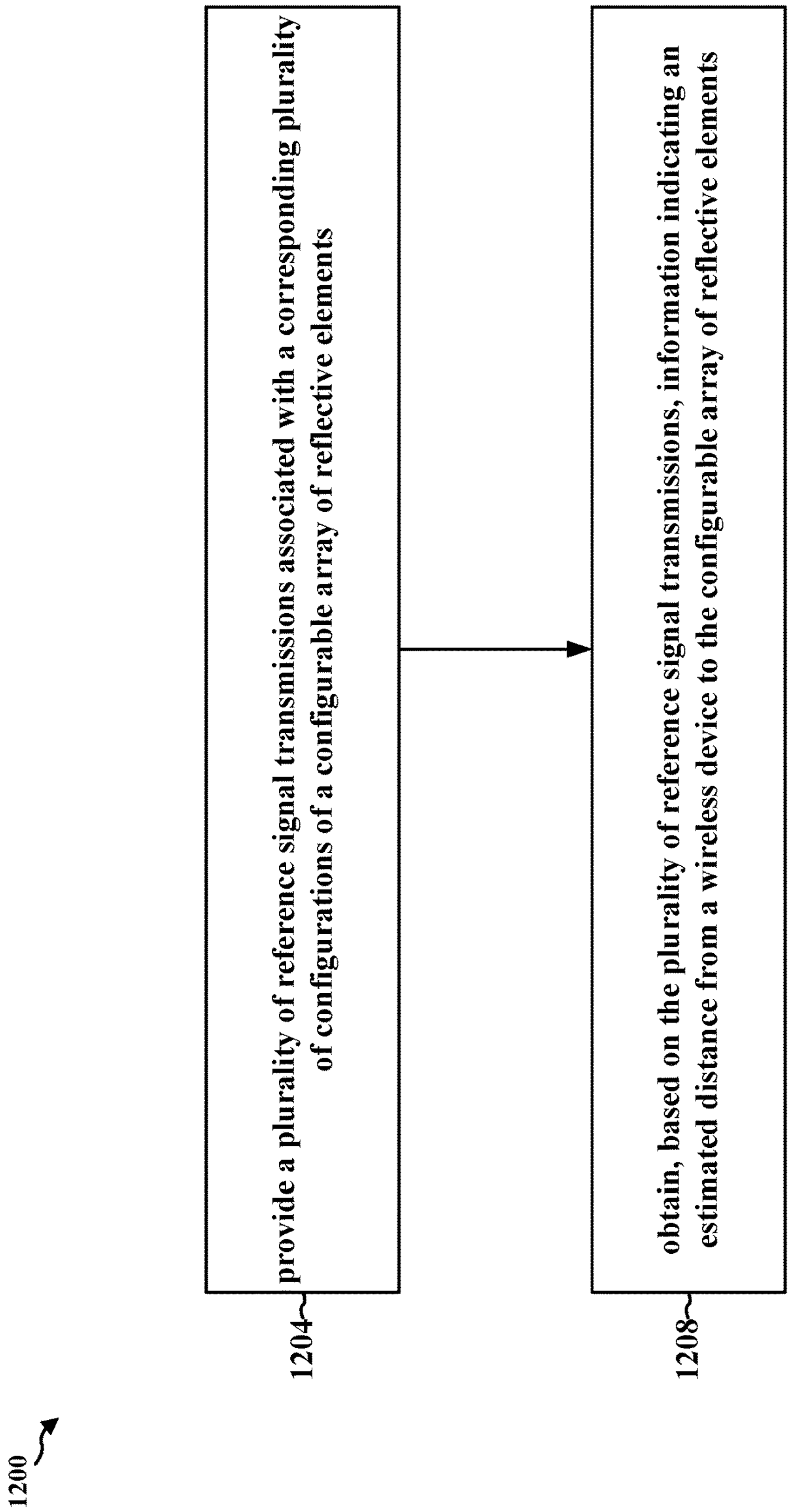
FIG. 12 is a flowchart of a method of wireless communication, in accordance with various aspects of the present disclosure.

FIG. 12 is a flowchart 1200 of a method of wireless communication. The method may be performed by a base station, a RIS, or a RIS controller in concert with a RIS (e.g., the base station 102 or 902; the RIS 103, 906, or 1740; the RIS controller 108; the controller 1741; the network entity 1502 or 1602). In the discussion below, the actor will be referred to as a network device that may be a base station or a RIS, where a RIS may refer to any of a configurable array of reflective elements, a RIS controller, or an apparatus including a configurable array of reflective elements and a RIS controller. In some aspects, the network device may transmit, or receive, configuration information relating to a plurality of reference signal transmissions associated with a corresponding plurality of configurations of the RIS (e.g., or more generally, a configurable array of reflective elements). In some aspects, the configuration information indicates resources associated with each reference signal transmission in the plurality of reference signal transmissions and a corresponding configuration in the corresponding plurality of configurations. In some aspects, the network device may be a RIS and the RIS may receive the configuration information from a base station (or a UE). The network device ins some aspects, may be the base station and the base station may transmit the configuration information to the configure the RIS according to the configuration information. For example, referring to FIGS. 6-9, the base station 902 may transmit, and the RIS 906 may receive, RIS RS configuration 910 indicating a configuration of a set of RS resources (e.g., for the first set of reference signals 710 or 912) and a corresponding set of RIS configurations (e.g., RIS configurations 610, 620, 630, 711, 712, 713, 810, 820, 830, or 840).

At 1204, the network device may provide a plurality of reference signal transmissions associated with a corresponding plurality of configurations of a configurable array of reflective elements. For example, 1204 may be performed by CU processor 1612, DU processor 1632, RU processor 1642, transceiver(s) 1646, antenna(s) 1680, and/or RIS ranging component 199 of FIG. 16 or by controller 1741, processor 1742, transceiver(s) 1746, passive antenna array 1780, RIS surface 1790, and/or RIS ranging component 199 of FIG. 17. Providing the plurality of reference signal transmissions, in some aspects, may include transmitting the plurality of reference signal transmissions when the network device is a base station or may include reflecting, at the RIS, the plurality of reference signal transmissions from the base station toward the wireless device with the corresponding plurality of configurations when the network device is the RIS. For example, referring to FIGS. 6-9, the base station 902 may transmit the first set of reference signals 912 (e.g., including RS 916 and RS 920), and the RIS 906 may reflect based on a corresponding set of configurations (e.g., RIS configurations 610, 620, 630, 711, 712, 713, 810, 820, 830, or 840) a corresponding plurality of beamformed reference signals (e.g., including beamformed RS 918 and beamformed RS 922).

At 1208, the network device may obtain, based on the plurality of reference signal transmissions, information indicating an estimated distance from a wireless device to the configurable array of reflective elements. For example, 1208 may be performed by CU processor 1612, DU processor 1632, RU processor 1642, transceiver(s) 1646, antenna(s) 1680, and/or RIS ranging component 199 of FIG. 16 or by controller 1741, processor 1742, transceiver(s) 1746, passive antenna array 1780, RIS surface 1790, and/or RIS ranging component 199 of FIG. 17. In some aspects, the information related to the estimated distance includes measurement information based on the wireless device measuring the received signal power for each of the plurality of reference signal transmissions. Obtaining, at 1208, the information related to the estimated distance, in some aspects, may include receiving the measurement information from the wireless device at the network device (e.g., the base station or the RIS). In some aspects, the measurement information may include one or more of a first indication of a first set of received signal powers based on the received signal power measured for each of the plurality of reference signal transmissions, a second indication of a second set of relative received signal powers based on the received signal power measured for each of the plurality of reference signal transmissions, a distance estimate, or a third indication of an estimated range of distances. For example, referring to FIGS. 6-9, the base station 902 or the RIS 906 may receive distance indication 926 from the UE 904 based on the UE 904 measuring, at 914, the set of reference signals 912 and estimating the distance to the RIS 906 and/or preparing a report at 924 associated with the corresponding set of configurations (e.g., RIS configurations 610, 620, 630, 711, 712, 713, 810, 820, 830, or 840).

In some aspects, obtaining the information related to the estimated distance at 1208 may further include determining the estimated distance based on the information related to the estimated distance (or the measurement information). Determining the estimated distance, in some aspects, may be based on known intervals and or crossover points associated with the corresponding plurality of configurations of the RIS used to provide (e.g., beamform) the reference signals. For example, determining the estimated distance may be based on the distance estimate or the third indication of the range of distances or, in some aspects, may be based on at least one of the first set of received signal powers or the second set of relative received signal powers (or ranked reference signals). For example, referring to FIGS. 6-9, the base station 902 (or the RIS 906) may, at 928, estimate the distance between the UE 904 and the RIS 906 based on the distance indication 926 received from the UE 904 (e.g., based on received signal powers measured in relation to the set of reference signals 912 and the corresponding set of configurations (e.g., RIS configurations 610, 620, 630, 711, 712, 713, 810, 820, 830, or 840)).

In some aspects, based on the information obtained by the network device, the network device may provide, or transmit, second configuration information relating to a second plurality of reference signal transmissions associated with a second corresponding plurality of configurations of the RIS. Similar to the first configuration information described above, in some aspects, the second configuration information may indicate resources associated with each reference signal transmission in the second plurality of reference signal transmissions and a corresponding configuration in the second corresponding plurality of configurations. For example, referring to FIGS. 6-9, the base station may transmit, and UE 904 and the RIS 906 may receive, the updated RIS RS configuration 930 indicating a configuration of an additional set of RS resources (e.g., for the additional set of reference signals 730 or 932) and an additional corresponding set of RIS configurations (e.g., RIS configurations 610, 620, 630, 731, 732, 733, 734, 735, 736, 810, 820, 830, or 840). In some aspects, the network device may provide (e.g., either transmit or reflect when the network device is a base station or RIS, respectively) at least one signal (or transmission) to the UE, e.g., via the configurable array of reflective elements in a (data transmission) configuration based on the information indicating the estimated distance obtained at 1208. In some aspects, e.g., as discussed in relations to FIGS. 7-9, before receiving the at least one signal (or transmission), additional iterations of the operations discussed above may be performed to refine the distance estimation (e.g., to identify the distance with greater accuracy or to narrow an estimated range to less than a threshold value for a width of a range) and the (data transmission) configuration may further be based on the additional iterations.

Figure 13:
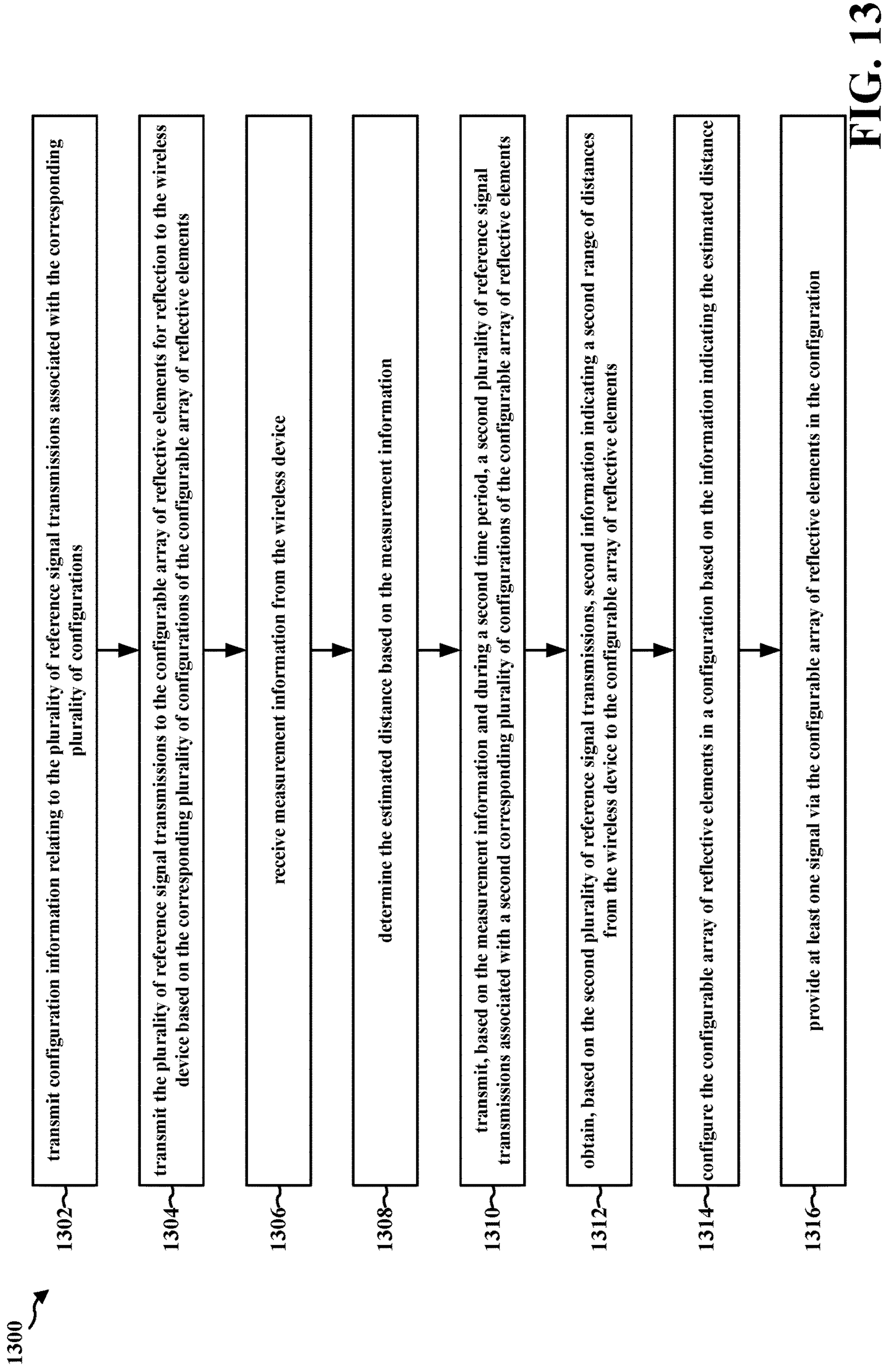
FIG. 13 is a flowchart of a method of wireless communication, in accordance with various aspects of the present disclosure.

FIG. 13 is a flowchart 1300 of a method of wireless communication. The method may be performed by a base station (e.g., the base station 102 or 902; the network entity 1502 or 1602). At 1302, the base station may transmit configuration information relating to a plurality of reference signal transmissions associated with a corresponding plurality of configurations of a configurable array of reflective elements (e.g., a RIS). For example, 1302 may be performed by CU processor 1612, DU processor 1632, RU processor 1642, transceiver(s) 1646, antenna(s) 1680, and/or RIS ranging component 199 of FIG. 16. In some aspects, the configuration information indicates resources associated with each reference signal transmission in the plurality of reference signal transmissions and a corresponding configuration in the corresponding plurality of configurations. In some aspects, the RIS configurations may be transparent to a wireless device measuring the reference signals, such that the corresponding (RIS) configuration in the corresponding plurality of (RIS) configurations may not be indicated to the wireless device and the base station may perform the association between the corresponding plurality of (RIS) configurations and a set of measured received signal power values, e.g., received at 1306 from a wireless device as described below, based on other identifiers of the RS, or RS resources, that may be indicated in the configuration information. For example, referring to FIGS. 6-9, the base station 902 may transmit RIS RS configuration 910 indicating a configuration of a set of RS resources (e.g., for the first set of reference signals 710 or 912) and a corresponding set of RIS configurations (e.g., RIS configurations 610, 620, 630, 711, 712, 713, 810, 820, 830, or 840).

At 1304, the base station may transmit the plurality of reference signal transmissions to the configurable array of reflective elements for reflection to the wireless device based on the corresponding plurality of configurations of the configurable array of reflective elements. For example, 1304 may be performed by CU processor 1612, DU processor 1632, RU processor 1642, transceiver(s) 1646, antenna(s) 1680, and/or RIS ranging component 199 of FIG. 16. As discussed above, the plurality of transmitted reference signal transmissions may include reference signal transmissions subsequently beamformed by the RIS according to the corresponding plurality of configurations of the RIS. For example, referring to FIGS. 6-9, the base station 902 may transmit the set of reference signals 912, e.g., including RS 916 and RS 920, to be beamformed based on the set of n RIS configurations 913 (e.g., RIS configurations 610, 620, 630, 711, 712, 713, 810, 820, 830, or 840) to produce beamformed RS 918 or 922.

At 1306, the base station may receive, based on the plurality of reference signal transmissions, information indicating an estimated distance from the wireless device to the configurable array of reflective elements. For example, 1306 may be performed by CU processor 1612, DU processor 1632, RU processor 1642, transceiver(s) 1646, antenna(s) 1680, and/or RIS ranging component 199 of FIG. 16. In some aspects, the information related to the estimated distance may be received from the wireless device (via the RIS) and may include one or more of a first set of received signal powers associated with the plurality of reference signal transmissions, a second set of relative received signal powers associated with the plurality of reference signal transmissions, a distance estimate, or an estimated range of distances. For example, referring to FIGS. 6-9, the base station 902 may receive distance indication 926 from the UE 904 based on the UE 904 measuring, at 914, the set of reference signals 912 and estimating the distance to the RIS 906 and/or preparing a report at 924 associated with the corresponding set of configurations (e.g., RIS configurations 610, 620, 630, 711, 712, 713, 810, 820, 830, or 840).

At 1308, the base station may determine the estimated distance based on the information related to the estimated distance (or the measurement information). For example, 1308 may be performed by CU processor 1612, DU processor 1632, RU processor 1642, and/or RIS ranging component 199 of FIG. 16. Determining the estimated distance, in some aspects, may be based on known intervals and or crossover points associated with the corresponding plurality of configurations of the RIS used to provide (e.g., beamform) the reference signals. For example, determining the estimated distance may be based on the distance estimate or the third indication of the range of distances included in the measurement information received from the wireless device or, in some aspects, may be based on at least one of the first set of received signal powers or the second set of relative received signal powers (or ranked reference signals). For example, referring to FIGS. 6-9, the base station 902 (or the RIS 906) may, at 928, estimate the distance between the UE 904 and the RIS 906 based on the distance indication 926 received from the UE 904 (e.g., based on received signal powers measured in relation to the set of reference signals 912 and the corresponding set of configurations (e.g., RIS configurations 610, 620, 630, 711, 712, 713, 810, 820, 830, or 840)).

Based on the information provided to the base station (or RIS controller), the base station may transmit, based on the first information and during a second time period, a configuration for a second plurality of reference signal transmissions associated with a second corresponding plurality of configurations of the configurable array of reflective elements. As described above, in some aspects, the second configuration information may indicate resources associated with each reference signal transmission in the second plurality of reference signal transmissions and a corresponding configuration in the second corresponding plurality of configurations. For example, referring to FIGS. 6-9, the base station 902 may transmit the updated RIS RS configuration 930 indicating a configuration of a set of RS resources (e.g., for the additional set of reference signals 730 or 932) and a corresponding set of RIS configurations (e.g., RIS configurations 610, 620, 630, 731, 732, 733, 734, 735, 736, 810, 820, 830, or 840).

At 1310, the base station may provide, or transmit, based on the configuration for a second plurality of reference signal transmissions, the second plurality of reference signal transmissions associated with the second corresponding plurality of configurations of the configurable array of reflective elements. For example, 1310 may be performed by CU processor 1612, DU processor 1632, RU processor 1642, transceiver(s) 1646, antenna(s) 1680, and/or RIS ranging component 199 of FIG. 16. As discussed above, the second plurality of reference signal transmissions may include reference signal transmissions beamformed by the RIS according to the second corresponding plurality of configurations of the RIS. For example, referring to FIGS. 6-9, the base station 902 may transmit the additional set of reference signals 932 (e.g., including RS 936 and RS 940), and the RIS 906 may reflect based on a corresponding set of configurations (e.g., RIS configurations 610, 620, 630, 731, 732, 733, 734, 735, 736, 810, 820, 830, or 840) a corresponding plurality of beamformed reference signals (e.g., including beamformed RS 938 and beamformed RS 942).

At 1312, the base station may obtain, or receive, based on the second plurality of reference signal transmissions, second information indicating a second range of distances from the wireless device to the configurable array of reflective elements. For example, 1312 may be performed by CU processor 1612, DU processor 1632, RU processor 1642, transceiver(s) 1646, antenna(s) 1680, and/or RIS ranging component 199 of FIG. 16. In some aspects, the second information may be in a same format, or include the same information, as the information related to the estimated distance obtained, or received, at 1306. In some aspects, the second range of distances may be included in, and narrower than, the first range of distances. For example, if a first set of reference signals identified an estimated distance in a range of 2.2 m to 5.7 m, a second set of RIS configurations including at least RIS configurations 810, 830, and 840 may be used to refine the distance range to be one of the range of 2.2 m to 3.1 m, 3.1 m to 3.5 m, or 3.5 m to 5.7 m. For example, referring to FIGS. 6-9, the base station 902 may receive distance indication 946 from the UE 904 based on the UE 904 measuring, at 934, the additional set of reference signals 932 and estimating the distance to the RIS 906 and/or preparing a report at 944 associated with the corresponding set of RIS configurations (e.g., RIS configurations 610, 620, 630, 731, 732, 733, 734, 735, 736, 810, 820, 830, or 840). In some aspects, the first plurality of reference signal transmissions may be sufficient for a particular application and a transmission of the second plurality of reference signals may be omitted.

At 1314, the base station may configure the configurable array of reflective elements (e.g., the RIS) in a configuration (e.g., a data-transmission configuration used for at least one subsequent signal transmission) based on the information indicating the estimated distance. For example, 1314 may be performed by CU processor 1612, DU processor 1632, RU processor 1642, transceiver(s) 1646, antenna(s) 1680, and/or RIS ranging component 199 of FIG. 16. In some aspects, the configuration may be associated with one of a beamforming operation or a beam focusing operation at the configurable array of reflective elements. For example, referring to FIGS. 6-9, the base station 902 may transmit the RIS configuration 950 to configure the RIS 906 for beam shaping a communication from the base station 902 to the UE 904.

The configuration based on the information indicating the estimated distance, in some aspects, may be one of a first configuration in the corresponding plurality of configurations of the configurable array of reflective elements or a second configuration that is not in the corresponding plurality of configurations of the configurable array of reflective elements. For example, a configuration that is not included in the first (or second) corresponding pluralities of configurations may be used when the RIS shapes a reference signal beam (e.g., where shaping a beam may refer to either beamforming and beam focusing) using one type of beam shaping, e.g., beamforming or beam focusing, and the subsequent transmission, e.g., a data or control transmission, is associated with a different type of beam shaping, e.g., beam focusing or beamforming, respectively. Additionally, even when the RIS shapes a reference signal beam using a same type of beam shaping, e.g., beamforming or beam focusing, as used for the subsequent transmission, the corresponding first (or second) pluralities of configurations may not include a particular configuration optimized for the distance estimated as discussed above, and a different configuration not included in the corresponding first (or second) pluralities of configurations may be used for the subsequent transmission. Alternatively, or additionally, when the RIS shapes a reference signal beam using a same type of beam shaping, e.g., beamforming or beam focusing, as used for the subsequent transmission, the corresponding first (or second) pluralities of configurations may include a particular configuration optimized for the distance estimated as discussed above, and that particular configuration may be used for the subsequent transmission.

At 1316, the base station may provide, or transmit, at least one signal via the configurable array of reflective elements in the (data-transmission) configuration. For example, 1316 may be performed by CU processor 1612, DU processor 1632, RU processor 1642, transceiver(s) 1646, antenna(s) 1680, and/or RIS ranging component 199 of FIG. 16. In some aspects, the (data transmission) configuration based on the information indicating the estimated distance may further be based on the second information indicating the second range of distances from the wireless device to the RIS. For example, referring to FIGS. 6-9, the base station 902 may transmit the data 952 via the RIS 906 that performs a beam shaping (e.g., beam focusing or beamforming) for the communication from the base station 902 to the UE 904.

Figure 14:
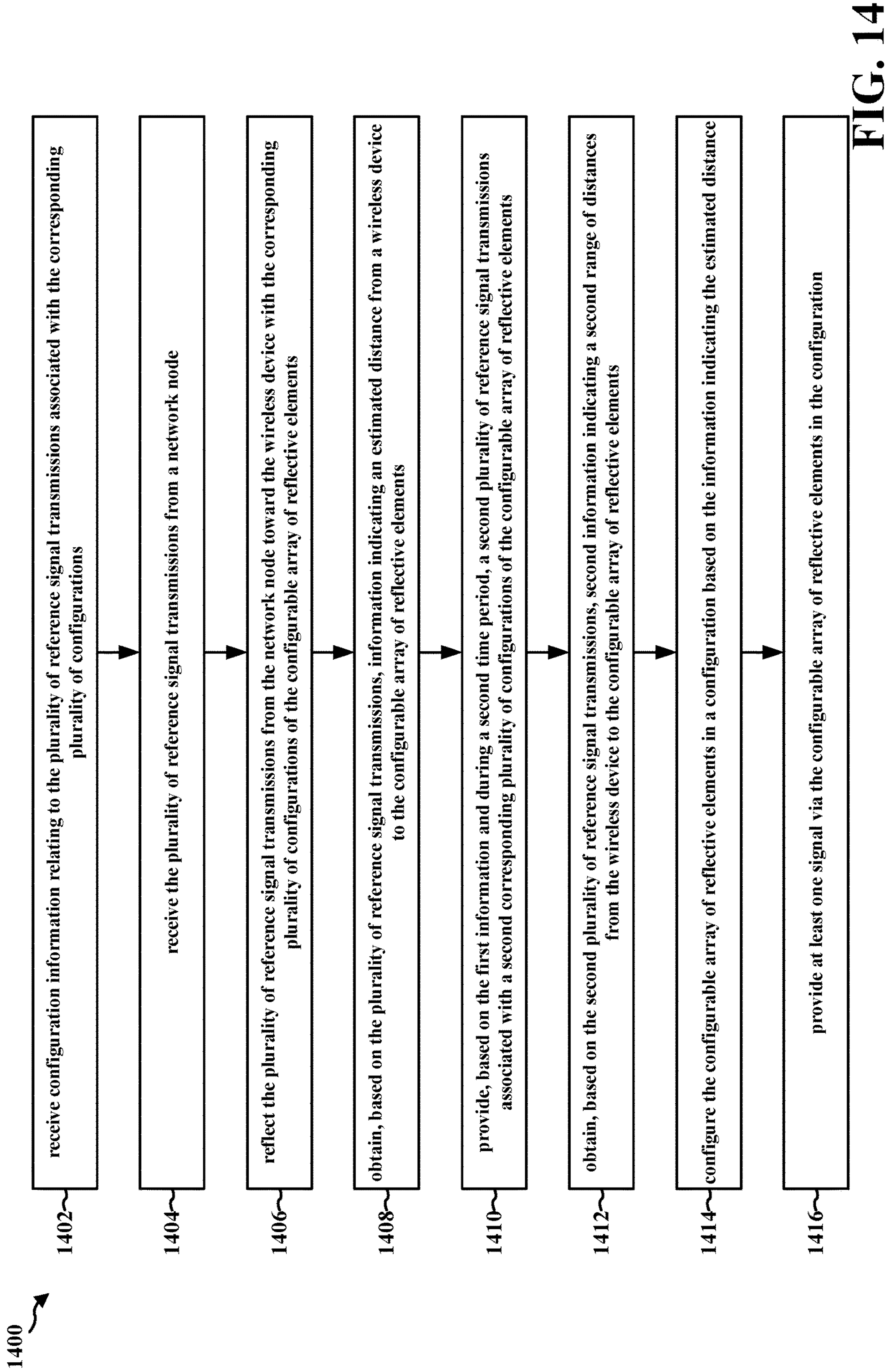
FIG. 14 is a flowchart of a method of wireless communication, in accordance with various aspects of the present disclosure.

FIG. 14 is a flowchart 1400 of a method of wireless communication. The method may be performed by a RIS (e.g., a device comprising a RIS and a RIS controller) (e.g., the RIS 103, 906, or 1740; the RIS controller 108; the controller 1741). At 1402, the RIS may receive configuration information relating to a plurality of reference signal transmissions associated with a corresponding plurality of configurations of a configurable array of reflective elements of the RIS. For example, 1402 may be performed by controller 1741, processor 1742, transceiver(s) 1746, and/or RIS ranging component 199 of FIG. 17. In some aspects, the configuration information indicates resources associated with each reference signal transmission in the plurality of reference signal transmissions and a corresponding configuration in the corresponding plurality of configurations. For example, referring to FIGS. 6-9, the base station 902 may transmit, and the RIS 906 may receive, RIS RS configuration 910 indicating a configuration of a set of RS resources (e.g., for the first set of reference signals 710 or 912) and a corresponding set of RIS configurations (e.g., RIS configurations 610, 620, 630, 711, 712, 713, 810, 820, 830, or 840).

At 1404, the RIS may receiving the plurality of reference signal transmissions from a network node. For example, 1404 may be performed by controller 1741, processor 1742, transceiver(s) 1746, passive antenna array 1780, RIS surface 1790, and/or RIS ranging component 199 of FIG. 17. In some aspects, the plurality of reference signal transmissions may be received using the resources (e.g., a CSI-RS resources) indicated in the configuration received at 1402. For example, referring to FIGS. 6-9, the base station 902 may transmit, and the RIS 906 may receive, the set of reference signals 912 or 710, e.g., including RS 916 and RS 920, to be beamformed based on the set of n RIS configurations 913 to produce beamformed RS 918 or 922 (e.g., corresponding to curves 611, 621, 631, 811, 821, 831, or 841).

At 1406, the RIS may provide a plurality of reference signal transmissions associated with a corresponding plurality of configurations of a configurable array of reflective elements of the RIS. For example, 1406 may be performed by controller 1741, processor 1742, passive antenna array 1780, RIS surface 1790, and/or RIS ranging component 199 of FIG. 17. Providing the plurality of reference signal transmissions, in some aspects, may include reflecting (and beam shaping), at the RIS, the plurality of reference signal transmissions from the base station toward the wireless device based on the corresponding plurality of configurations of the configurable array of reflective elements. For example, referring to FIGS. 6-9, the base station 902 may transmit the first set of reference signals 912 or 710 (e.g., including RS 916 and RS 920), and the RIS 906 may reflect, and beam shape, the received reference signals based on the corresponding set of configurations (e.g., RIS configurations 610, 620, 630, 711, 712, 713, 810, 820, 830, or 840) to generate a corresponding plurality of beamformed reference signals (e.g., including beamformed RS 918 and beamformed RS 922).

At 1408, the RIS may obtain, based on the plurality of reference signal transmissions, information indicating an estimated distance from the wireless device to the configurable array of reflective elements. For example, 1408 may be performed by controller 1741, processor 1742, transceiver(s) 1746, and/or RIS ranging component 199 of FIG. 17. In some aspects, the information related to the estimated distance may be measurement information received from the wireless device or from the base station and may include one or more of a first set of received signal powers associated with the plurality of reference signal transmissions, a second set of relative received signal powers associated with the plurality of reference signal transmissions, a distance estimate, or an estimated range of distances. For example, referring to FIGS. 6-9, the RIS 906 may receive distance indication 926 from the UE 904 based on the UE 904 measuring, at 914, the set of reference signals 912 and estimating the distance to the RIS 906 and/or preparing a report at 924 associated with the corresponding set of configurations (e.g., RIS configurations 610, 620, 630, 711, 712, 713, 810, 820, 830, or 840).

As part of obtaining the information indicating the estimated distance, the RIS may determine the estimated distance based on the measurement information related to the estimated distance (or the measurement information). Determining the estimated distance, in some aspects, may be based on known intervals and or crossover points associated with the corresponding plurality of configurations of the RIS used to provide (e.g., beamform) the reference signals. For example, determining the estimated distance may be based on the distance estimate or the third indication of the range of distances included in the measurement information received from the wireless device or, in some aspects, may be based on at least one of the first set of received signal powers or the second set of relative received signal powers (or ranked reference signals). For example, referring to FIGS. 6-9, the RIS 906 may, at 928, estimate the distance between the UE 904 and the RIS 906 based on the distance indication 926 received from the UE 904 (e.g., based on received signal powers measured in relation to the set of reference signals 912 and the corresponding set of configurations (e.g., RIS configurations 610, 620, 630, 711, 712, 713, 810, 820, 830, or 840)).

Based on the information provided to the base station (or RIS controller), the RIS may receive, based on the first information and during a second time period, a configuration for a second plurality of reference signal transmissions associated with a second corresponding plurality of configurations of the configurable array of reflective elements. As described above, in some aspects, the second configuration information may indicate resources associated with each reference signal transmission in the second plurality of reference signal transmissions and a corresponding configuration in the second corresponding plurality of configurations. For example, referring to FIGS. 6-9, the base station 902 may transmit, and the RIS 906 may receive, the updated RIS RS configuration 930 indicating a configuration of a set of RS resources (e.g., for the additional set of reference signals 730 or 932) and a corresponding set of RIS configurations (e.g., RIS configurations 610, 620, 630, 731, 732, 733, 734, 735, 736, 810, 820, 830, or 840).

At 1410, the RIS may provide, or reflect, based on the configuration for a second plurality of reference signal transmissions, the second plurality of reference signal transmissions associated with the second corresponding plurality of configurations of the configurable array of reflective elements. For example, 1410 may be performed by controller 1741, processor 1742, passive antenna array 1780, RIS surface 1790, and/or RIS ranging component 199 of FIG. 17. As discussed above, the second plurality of reference signal transmissions may be reflected (and beamformed or beam focused) by the RIS according to the second corresponding plurality of configurations of the RIS. For example, referring to FIGS. 6-9, the base station 902 may transmit, and the RIS 906 may reflect and beam shape, the additional set of reference signals 932 (e.g., including RS 936 and RS 940) based on a corresponding set of configurations (e.g., RIS configurations 610, 620, 630, 731, 732, 733, 734, 735, 736, 810, 820, 830, or 840) to provide a corresponding plurality of beam shaped (or beamformed) reference signals (e.g., including beamformed RS 938 and beamformed RS 942).

At 1412, the RIS may obtain, or receive, based on the second plurality of reference signal transmissions, second information indicating a second range of distances from the wireless device to the configurable array of reflective elements. For example, 1412 may be performed by controller 1741, processor 1742, transceiver(s) 1746, and/or RIS ranging component 199 of FIG. 17. In some aspects, the second information may be in a same format, or include the same information, as the information related to the estimated distance obtained, or received, at 1408. In some aspects, the second range of distances may be included in, and narrower than, the first range of distances. For example, if a first set of reference signals identified an estimated distance in a range of 2.2 m to 5.7 m, a second set of RIS configurations including at least RIS configurations 810, 830, and 840 may be used to refine the distance range to be one of the range of 2.2 m to 3.1 m, 3.1 m to 3.5 m, or 3.5 m to 5.7 m. For example, referring to FIGS. 6-9, the RIS 906 may receive distance indication 946 from the UE 904 based on the UE 904 measuring, at 934, the additional set of reference signals 932 and estimating the distance to the RIS 906 and/or preparing a report at 944 associated with the corresponding set of RIS configurations (e.g., RIS configurations 610, 620, 630, 731, 732, 733, 734, 735, 736, 810, 820, 830, or 840). In some aspects, the first plurality of reference signal transmissions may be sufficient for a particular application and a transmission of the second plurality of reference signals may be omitted.

At 1414, the RIS may configure the configurable array of reflective elements in a configuration (e.g., a data-transmission configuration used for at least one subsequent signal transmission) based on the information indicating the estimated distance. For example, 1414 may be performed by controller 1741, processor 1742, and/or RIS ranging component 199 of FIG. 17. In some aspects, the configuration may be associated with one of a beamforming operation or a beam focusing operation at the configurable array of reflective elements. For example, referring to FIGS. 6-9, the RIS 906 may configure, at 951, a configurable array of reflective elements associated with the RIS 906 based on receiving the RIS configuration 950 from the base station 902 to configure the RIS 906 for beam shaping a communication from the base station 902 to the UE 904.

The configuration based on the information indicating the estimated distance, in some aspects, may be one of a first configuration in the corresponding plurality of configurations of the configurable array of reflective elements or a second configuration that is not in the corresponding plurality of configurations of the configurable array of reflective elements. For example, a configuration that is not included in the first (or second) corresponding pluralities of configurations may be used when the RIS shapes a reference signal beam (e.g., where shaping a beam may refer to either beamforming and beam focusing) using one type of beam shaping, e.g., beamforming or beam focusing, and the subsequent transmission, e.g., a data or control transmission, is associated with a different type of beam shaping, e.g., beam focusing or beamforming, respectively. Additionally, even when the RIS shapes a reference signal beam using a same type of beam shaping, e.g., beamforming or beam focusing, as used for the subsequent transmission, the corresponding first (or second) pluralities of configurations may not include a particular configuration optimized for the distance estimated as discussed above, and a different configuration not included in the corresponding first (or second) pluralities of configurations may be used for the subsequent transmission. Alternatively, or additionally, when the RIS shapes a reference signal beam using a same type of beam shaping, e.g., beamforming or beam focusing, as used for the subsequent transmission, the corresponding first (or second) pluralities of configurations may include a particular configuration optimized for the distance estimated as discussed above, and that particular configuration may be used for the subsequent transmission.

At 1416, the RSI may provide, or reflect, at least one signal via the configurable array of reflective elements in the (data-transmission) configuration. For example, 1416 may be performed by controller 1741, processor 1742, passive antenna array 1780, RIS surface 1790, and/or RIS ranging component 199 of FIG. 17. In some aspects, the (data transmission) configuration based on the information indicating the estimated distance may further be based on the second information indicating the second range of distances from the wireless device to the RIS. Providing, or reflecting, the at least one signal at 1416 via the configurable array of reflective elements in the (data-transmission) configuration, in some aspects, may include reflecting a received signal with beam shaping, e.g., beamforming or beam focusing. For example, referring to FIGS. 6-9, the RIS 906 may reflect the data 952 transmitted by the base station 902 for the UE 904 using the configurable array of reflective elements in the (data-transmission) configuration indicated by the RIS configuration 950 and configured at 951.

Figure 15:
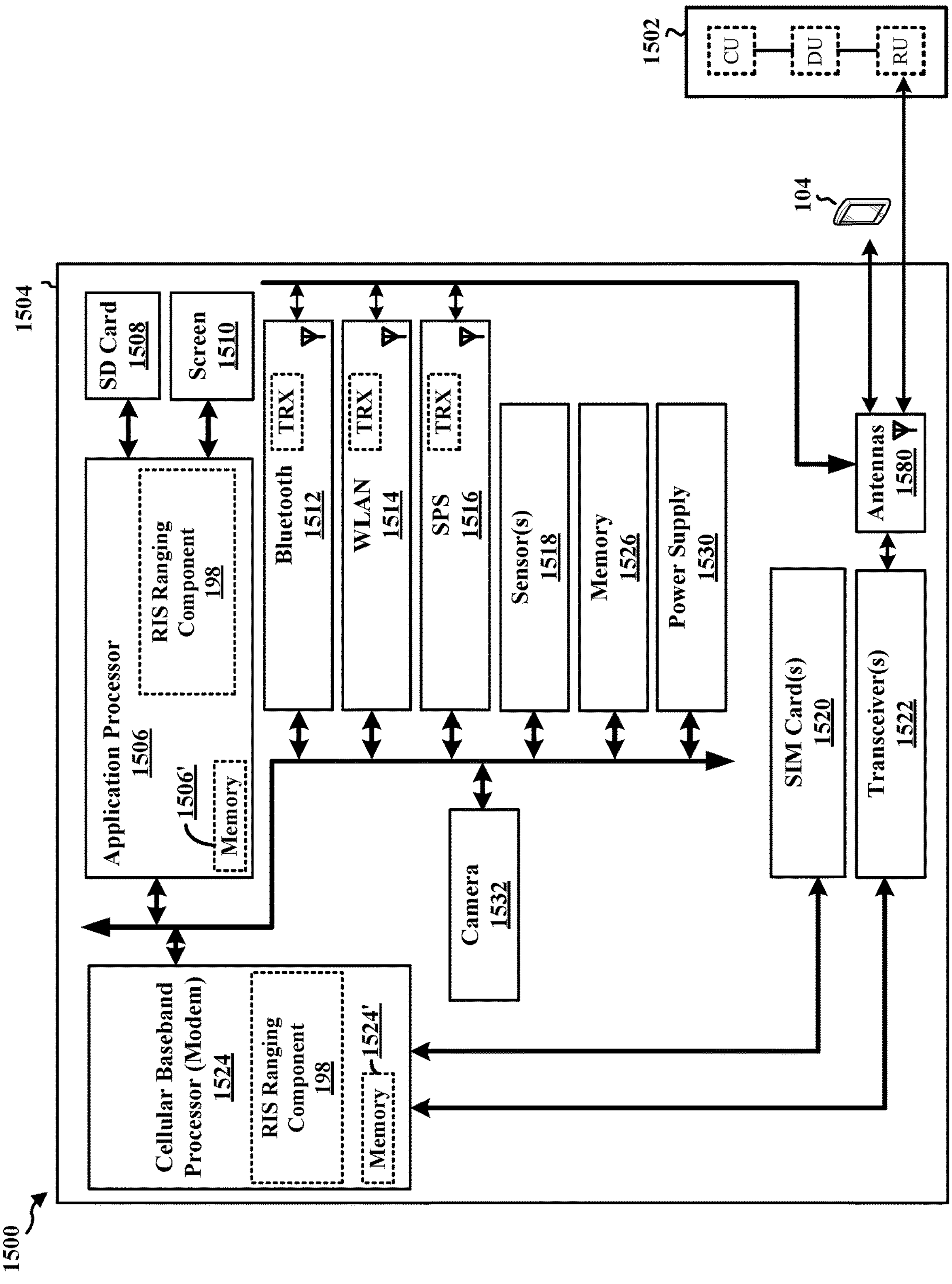
FIG. 15 is a diagram illustrating an example of a hardware implementation for an apparatus, in accordance with various aspects of the present disclosure.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers

1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the one or more antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the RIS ranging component 198 may be configured to receive a plurality of reference signal transmissions associated with a corresponding plurality of configurations of a configurable array of reflective elements and to provide, based on the plurality of reference signal transmissions, information indicating an estimated distance from the wireless device to the configurable array of reflective elements. The RIS ranging component 198 may be within the cellular baseband processor 1524, the application processor 1506, or both the cellular baseband processor 1524 and the application processor 1506. The RIS ranging component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, may include means for receiving a plurality of reference signal transmissions associated with a corresponding plurality of configurations of a configurable array of reflective elements. The apparatus 1504, and in particular the cellular baseband processor 1524 and/or the application processor 1506, in some aspects, may include means for providing, based on the plurality of reference signal transmissions, information indicating an estimated distance from the wireless device to the configurable array of reflective elements. The apparatus 1504, and in particular the cellular baseband processor 1524 and/or the application processor 1506, in some aspects, may include means for measuring a received signal power for each of the plurality of reference signal transmissions. The apparatus 1504, and in particular the cellular baseband processor 1524 and/or the application processor 1506, in some aspects, may include means for transmitting the measurement information, wherein the measurement information comprises one or more of a first indication of a first set of received signal powers based on the received signal power measured for each of the plurality of reference signal transmissions, a second indication of a second set of relative received signal powers based on the received signal power measured for each of the plurality of reference signal transmissions, a distance estimate, or a third indication of an estimated range of distances. The apparatus 1504, and in particular the cellular baseband processor 1524 and/or the application processor 1506, in some aspects, may include means for receiving at least one signal via the configurable array of reflective elements in a configuration based on the information indicating the estimated distance. The apparatus 1504, and in particular the cellular baseband processor 1524 and/or the application processor 1506, in some aspects, may include means for receiving, based on the first information and during a second time period, a second plurality of reference signal transmissions associated with a second corresponding plurality of configurations of the configurable array of reflective elements. The apparatus 1504, and in particular the cellular baseband processor 1524 and/or the application processor 1506, in some aspects, may include means for providing, based on the second plurality of reference signal transmissions, second information indicating a second range of distances from the wireless device to the configurable array of reflective elements. The apparatus 1504, and in particular the cellular baseband processor 1524 and/or the application processor 1506, in some aspects, may include means for receiving configuration information relating to the plurality of reference signal transmissions associated with the corresponding plurality of configurations. The means may be the RIS ranging component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 10 and 11.

Figure 16:
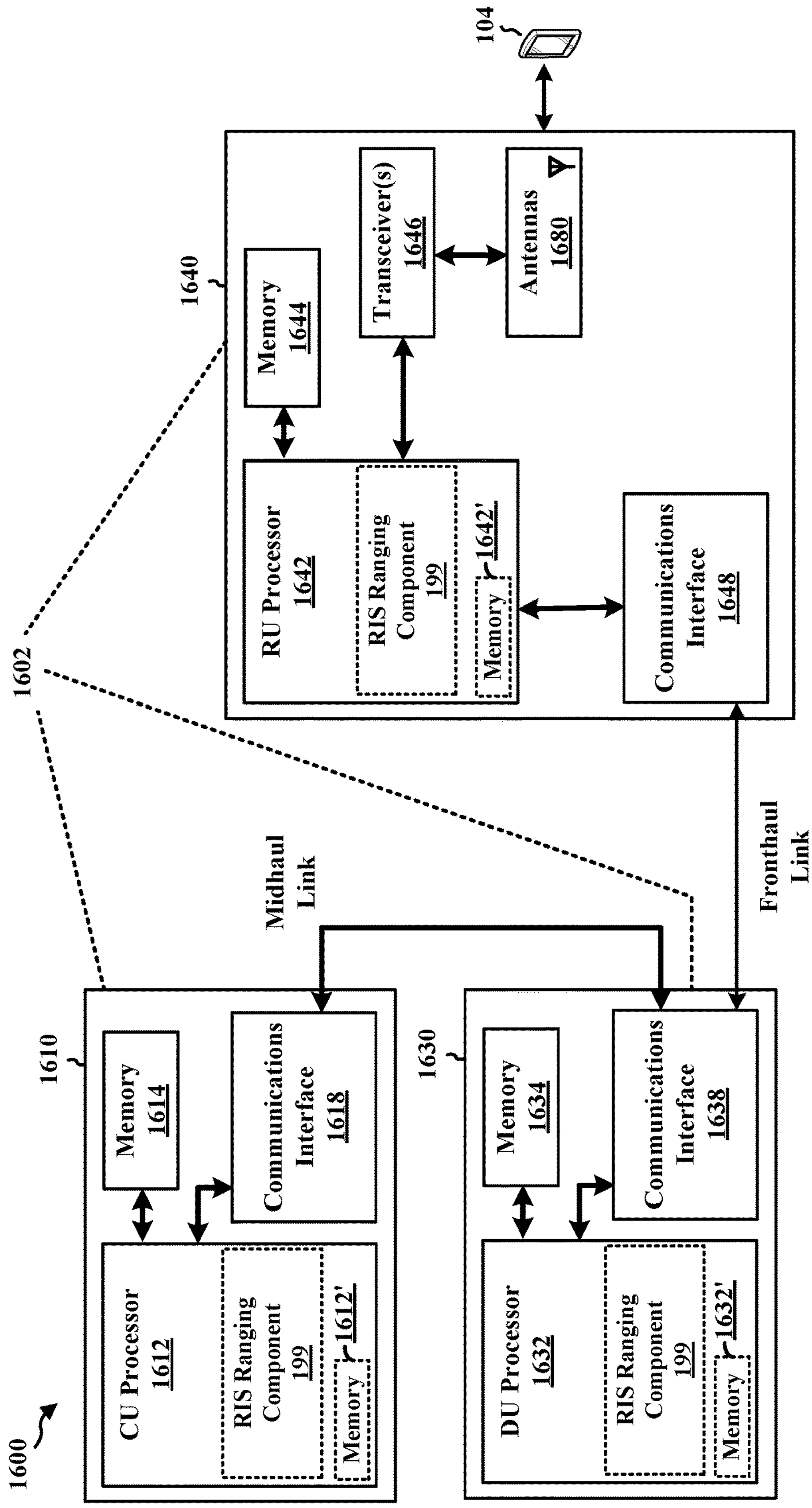
FIG. 16 is a diagram illustrating an example of a hardware implementation for a network entity, in accordance with various aspects of the present disclosure.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the RIS ranging component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, one or more antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the RIS ranging component 199 may be configured to provide a plurality of reference signal transmissions associated with a corresponding plurality of configurations of a configurable array of reflective elements, and obtain, based on the plurality of reference signal transmissions, information indicating an estimated distance from a wireless device to the configurable array of reflective elements. The RIS ranging component 199 may be within one or more processors of one or more of the CU 1610, DU 1630, and the RU 1640. The RIS ranging component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 may include means for providing a plurality of reference signal transmissions associated with a corresponding plurality of configurations of a configurable array of reflective elements. The network entity 1602, in some aspects, may include means for obtaining, based on the plurality of reference signal transmissions, information indicating an estimated distance from a wireless device to the configurable array of reflective elements. The network entity 1602, in some aspects, may include means for receiving, from the wireless device, measurement information comprising one or more of a first set of received signal powers associated with the plurality of reference signal transmissions, a second set of relative received signal powers associated with the plurality of reference signal transmissions, a distance estimate, or an estimated range of distances. The network entity 1602, in some aspects, may include means for determining the estimated distance based on the measurement information. The network entity 1602, in some aspects, may include means for configuring the configurable array of reflective elements in a configuration based on the information indicating the estimated distance. The network entity 1602, in some aspects, may include means for providing at least one signal via the configurable array of reflective elements in the configuration. The network entity 1602, in some aspects, may include means for providing, based on the first information and during a second time period, a second plurality of reference signal transmissions associated with a second corresponding plurality of configurations of the configurable array of reflective elements. The network entity 1602, in some aspects, may include means for obtaining, based on the second plurality of reference signal transmissions, second information indicating a second range of distances from the wireless device to the configurable array of reflective elements. The network entity 1602, in some aspects, may include means for transmitting configuration information relating to the plurality of reference signal transmissions associated with the corresponding plurality of configurations. The network entity 1602, in some aspects, may include means for transmitting the plurality of reference signal transmissions to the configurable array of reflective elements for reflection to the wireless device based on the corresponding plurality of configurations of the configurable array of reflective elements. The means may be the RIS ranging component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 12 and 13.

Figure 17:
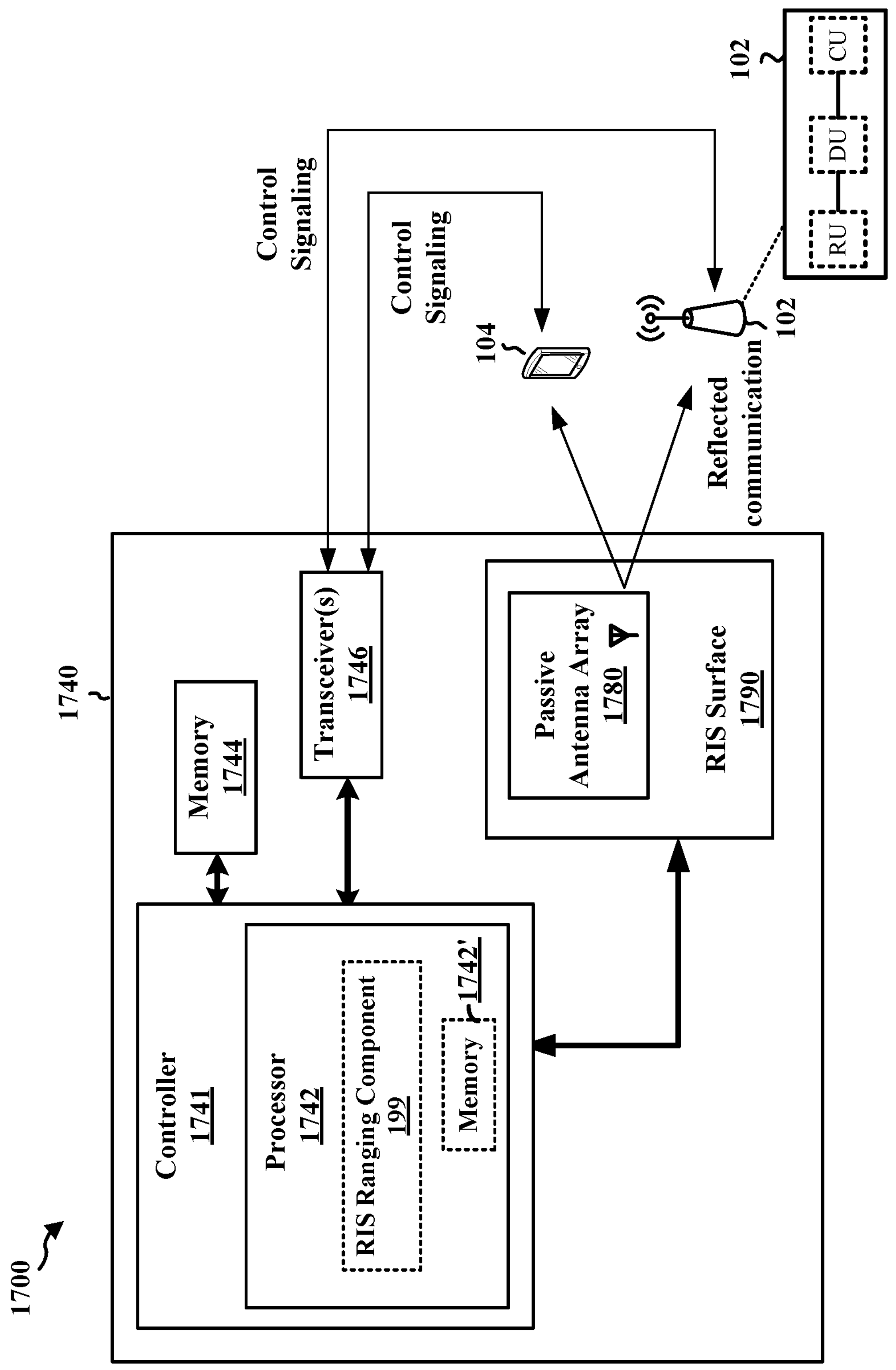
FIG. 17 is a diagram illustrating an example of a hardware implementation for a RIS, in accordance with various aspects of the present disclosure.

FIG. 17 is a diagram 1700 illustrating an example of a hardware implementation for a RIS 1740. The RIS 1740 includes a RIS surface 1790 that includes a passive antenna array 1780. The RIS surface 1790 includes a surface with a large number of densely placed reconfigurable elements that can reflect or refract an electromagnetic wave in target directions. FIG. 17 illustrates an example of the RIS surface 1790 reflecting communication between a UE 104 and a base station 102. The RIS 1740 includes a controller 1741 that controls an incident angle and an angle of reflection, e.g., by controlling reflection coefficients of (or phase shifts introduced by) the antenna elements of the RIS surface 1790. The controller 1741 may exchange communication, including control signaling or other signaling with a network node such as a base station 102 or a component of a base station 102 and/or a UE 104. The controller 1741 may exchange the communication via at least one transceiver 1746. The controller 1741 may include a processor 1742. The processor 1742 may include on-chip memory 1742'. In some aspects, the controller 1741 may further include additional memory modules 1744. The on-chip memory 1742' and the additional memory modules 1744 may each be considered a computer-readable medium/memory. Each computer-readable medium/memory may be non-transitory. The processor 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the RIS ranging component 199 may be configured to provide a plurality of reference signal transmissions associated with a corresponding plurality of configurations of a configurable array of reflective elements, and obtain, based on the plurality of reference signal transmissions, information indicating an estimated distance from a wireless device to the configurable array of reflective elements. The RIS ranging component 199 may be within the processor 1742. The RIS ranging component 199 may be one or more hardware components specifically configured to carry out the stated processes/algorithm, implemented by one or more processors configured to perform the stated processes/algorithm, stored within a computer-readable medium for implementation by one or more processors, or some combination thereof. The RIS 1740 may include a variety of components configured for various functions. In one configuration, the RIS 1740 may include means for providing a plurality of reference signal transmissions associated with a corresponding plurality of configurations of a configurable array of reflective elements. The RIS 1740, in some aspects, may include means for obtaining, based on the plurality of reference signal transmissions, information indicating an estimated distance from a wireless device to the configurable array of reflective elements. The RIS 1740, in some aspects, may include means for receiving, from the wireless device, measurement information comprising one or more of a first set of received signal powers associated with the plurality of reference signal transmissions, a second set of relative received signal powers associated with the plurality of reference signal transmissions, a distance estimate, or an estimated range of distances. The RIS 1740, in some aspects, may include means for determining the estimated distance based on the measurement information. The RIS 1740, in some aspects, may include means for configuring the configurable array of reflective elements in a configuration based on the information indicating the estimated distance. The RIS 1740, in some aspects, may include means for providing at least one signal via the configurable array of reflective elements in the configuration. The RIS 1740, in some aspects, may include means for providing, based on the first information and during a second time period, a second plurality of reference signal transmissions associated with a second corresponding plurality of configurations of the configurable array of reflective elements. The RIS 1740, in some aspects, may include means for obtaining, based on the second plurality of reference signal transmissions, second information indicating a second range of distances from the wireless device to the configurable array of reflective elements. The RIS 1740, in some aspects, may include means for receiving configuration information relating to the plurality of reference signal transmissions associated with the corresponding plurality of configurations. The RIS 1740, in some aspects, may include means for receiving the plurality of reference signal transmissions from a network node. The RIS 1740, in some aspects, may include means for reflecting the plurality of reference signal transmissions from the network node toward the wireless device with the corresponding plurality of configurations of the configurable array of reflective elements. The means may be the RIS ranging component 199 of the RIS 1740 configured to perform the functions recited by the means or as described in relation to FIGS. 12 and 14.

Various aspects relate generally to obtaining a RIS-to-receiver distance (e.g., a distance between a RIS and a UE being served via the RIS). Some aspects more specifically relate to obtaining the distance between the RIS and the UE with sufficient accuracy to achieve, or obtain, the benefits of beam focusing over a beamforming operation that steers a beam towards a direction without focusing the beam at a specific distance (or focusing with an "infinite" focal length or focusing distance). Aspects disclosed herein may avoid issues associated with power fluctuations (e.g., due to changing channel conditions between a 'calibration' operation and a measurement operation). For example, a RSRP based localization which compares the measured RSRP to a lookup table of pre-calculated or pre-measured power levels may suffer from power fluctuations due to a changing channel between generating the lookup table and measuring the RSRP. Accordingly, aspects disclosed herein are based on RSRP measurements corresponding to different RIS configurations (e.g., with different numbers of RIS elements used for beamforming) made during a short time period (e.g., a time period for which it may be assumed that each reference signal experiences similar channel conditions) to estimate a distance between a wireless device and the RIS as discussed herein. In some aspects discussed herein, the distance estimation may be based on relative RSRPs (e.g., an ordering of the measured RSRPs) for the different RIS configurations.

For example, a network device (e.g., at least a component of a network device including one of a RIS, a RIS controller, a base station, etc.) may, or may be configured to, provide, and a wireless device may (or may be configured to) receive, a plurality of reference signal transmissions associated with a corresponding plurality of configurations of a RIS (e.g., or, more generally, a configurable array of reflective elements). The wireless device, in some aspects, may provide, and the network device may obtain, based on the plurality of reference signal transmissions, information indicating an estimated distance from the wireless device to the RIS (e.g., the configurable array of reflective elements). In order to provide the information to the network device, the wireless device, in some aspects, may measure a received signal power, e.g., a RSRP, for each of the plurality of reference signal transmissions and the transmitted information may be measurement information based on measuring the received signal power. In some aspects, to provide the measurement information the wireless device may transmit, and the network device may receive, the measurement information including one or more of a first indication of a first set of received signal powers associated with the plurality of reference signal transmissions, a second indication of a second set of relative received signal powers (e.g., an ordering from highest power to lowest power or vice versa) associated with the plurality of reference signal transmissions, a distance estimate (e.g., an estimated distance calculated, or determined, by the UE), or a third indication of an estimated range of distances (e.g., an upper and lower bound for an estimated distance or an indication of a particular range from a set of known (candidate) ranges, for example, based on the plurality of configurations of the RIS). The network device may, based on the measurement information, determine the estimated distance. In some aspects, the network device may configure the RIS in a particular configuration based on the information indicating the estimated distance (e.g., based on the determined estimated distance) and may provide, and the wireless device may receive, at least one signal via the RIS in the particular configuration. In some aspects, additional iterations of the operations described above may be used to refine the distance estimation.

Particular aspects of the subject matter described in this disclosure can be implemented to realize one or more of the following potential advantages. In some examples, by comparing RSRP measurements between different RIS configurations, aspects presented herein can be used to support determination of distance between a RIS and a wireless device. Aspects presented herein may achieve higher estimation accuracy than the normal RSRP ranging approach because the impact of channel variability may be eliminated by using relative values among multiple measurements experiencing the same channel (e.g., the channel characteristics are assumed to remain relatively constant on the time scale of the measurements for the different RIS configurations discussed above). Accordingly, the calculated, or estimated, distance between the RIS and the wireless device may be used by a base station or RIS controller to reconfigure the RIS to do beam focusing at a desired distance (e.g., based on the estimated distance) to improve a received power at the wireless device (e.g., for a same transmitted power). Additionally, some aspects may also be implemented for low-cost transmitters with a single antenna (e.g., or a transmit array with a single RF chain and no subarray—so that array size cannot be changed to reshape the beam) since the beam formation is performed at the RIS and not at the transmitter.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving a plurality of reference signal transmissions associated with a corresponding plurality of configurations of a configurable array of reflective elements, and providing, based on the plurality of reference signal transmissions, information indicating an estimated distance from the wireless device to the configurable array of reflective elements.

Aspect 2 is the method of aspect 1, further including measuring a received signal power for each of the plurality of reference signal transmissions, where the information indicating the estimated distance is based on the received signal power measured for each of the plurality of reference signal transmissions.

Aspect 3 is the method of aspect 2, transmitting the measurement information, where the measurement information includes one or more of a first indication of a first set of received signal powers based on the received signal power measured for each of the plurality of reference signal transmissions, a second indication of a second set of relative received signal powers based on the received signal power measured for each of the plurality of reference signal transmissions, a distance estimate, or a third indication of an estimated range of distances, where the distance estimate or the third indication of the estimated range of distances is based on at least one of the first set of received signal powers or the second set of relative received signal powers.

Aspect 4 is the method of aspect 3, where the information indicating the estimated distance is transmitted to at least one of a base station, a network node, or a controller of the configurable array of reflective elements.

Aspect 5 is the method of any of aspects 1 to 4, further including receiving at least one signal via the configurable array of reflective elements in a configuration based on the information indicating the estimated distance.

Aspect 6 is the method of aspect 5, where the configuration is associated with one of a beamforming operation or a beam focusing operation at the configurable array of reflective elements.

Aspect 7 is the method of any aspects 5 and 6, where the configuration is associated with one of a beamforming operation or a beam focusing operation at the configurable array of reflective elements.

Aspect 8 is the method of any aspects 1 to 7, where the corresponding plurality of configurations is a first corresponding plurality of configurations including at least a first configuration using a first number of elements for a first beamforming operation and a second configuration using a second number of elements for a second beamforming operation, where the plurality of reference signal transmissions is a first plurality of reference signal transmission received during a first time period, and where the information indicating the estimated distance is first information indicating a first range of distances, the method further including receiving, based on the first information and during a second time period, a second plurality of reference signal transmissions associated with a second corresponding plurality of configurations of the configurable array of reflective elements, and providing, based on the second plurality of reference signal transmissions, second information indicating a second range of distances from the wireless device to the configurable array of reflective elements, where the second range of distances is included in, and narrower than, the first range of distances.

Aspect 9 is the method of any aspects 1 to 8, further including receiving configuration information relating to the plurality of reference signal transmissions associated with the corresponding plurality of configurations, where the configuration information includes an indication of resources associated with each reference signal transmission in the plurality of reference signal transmissions and a corresponding configuration in the corresponding plurality of configurations.

Aspect 10 is the method of any aspects 1 to 9, where the configurable array of reflective elements is a reconfigurable intelligent surface.

Aspect 11 is a method of wireless communication at a network device, including providing a plurality of reference signal transmissions associated with a corresponding plurality of configurations of a configurable array of reflective elements, and obtaining, based on the plurality of reference signal transmissions, information indicating an estimated distance from a wireless device to the configurable array of reflective elements.

Aspect 12 is the method of aspect 11, where obtaining the information related to the estimated distance includes receiving, from the wireless device, measurement information including one or more of a first set of received signal powers associated with the plurality of reference signal transmissions, a second set of relative received signal powers associated with the plurality of reference signal transmissions, a distance estimate, or an estimated range of distances, and determining the estimated distance based on the measurement information.

Aspect 13 is the method of any aspects 11 and 12, further including configuring the configurable array of reflective elements in a configuration based on the information indicating the estimated distance, and providing at least one signal via the configurable array of reflective elements in the configuration.

Aspect 14 is the method of aspect 13, where the configuration is one of a first configuration in the corresponding plurality of configurations of the configurable array of reflective elements or a second configuration that is not in the corresponding plurality of configurations of the configurable array of reflective elements.

Aspect 15 is the method of any aspects 13 and 14, where the configuration is associated with one of a beamforming operation or a beam focusing operation at the configurable array of reflective elements.

Aspect 16 is the method of any aspects 11 to 15, where the corresponding plurality of configurations is a first corresponding plurality of configurations including at least a first configuration using a first number of elements for a first beamforming operation and a second configuration using a second number of elements for a second beamforming operation, where the plurality of reference signal transmissions is a first plurality of reference signal transmission received during a first time period, and where the information indicating the estimated distance is first information indicating a first range of distances, the method further including providing, based on the first information and during a second time period, a second plurality of reference signal transmissions associated with a second corresponding plurality of configurations of the configurable array of reflective elements, and obtaining, based on the second plurality of reference signal transmissions, second information indicating a second range of distances from the wireless device to the configurable array of reflective elements, where the second range of distances is included in, and narrower than, the first range of distances.

Aspect 17 is the method of any aspects 11 to 16, where the network device includes a reconfigurable intelligent surface, the method further including receiving configuration information relating to the plurality of reference signal transmissions associated with the corresponding plurality of configurations, where the configuration information includes an indication of resources associated with each reference signal transmission in the plurality of reference signal transmissions and a corresponding configuration in the corresponding plurality of configurations.

Aspect 18 is the method of aspect 17, further including receiving the plurality of reference signal transmissions from a network node, where providing the plurality of reference signal transmissions includes reflecting the plurality of reference signal transmissions from the network node toward the wireless device with the corresponding plurality of configurations of the configurable array of reflective elements.

Aspect 19 is the method of any aspects 1 to 16, where the network device is at least a component of a base station and the configurable array of reflective elements is a reconfigurable intelligent surface, the method further including transmitting configuration information relating to the plurality of reference signal transmissions associated with the corresponding plurality of configurations, where the configuration information includes an indication of resources associated with each reference signal transmission in the plurality of reference signal transmissions and a corresponding configuration in the corresponding plurality of configurations.

Aspect 20 is the method of any aspects 1 to 16 and 19, where the network device is at least a component of a base station, and where providing the plurality of reference signal transmissions includes transmitting the plurality of reference signal transmissions to the configurable array of reflective elements for reflection to the wireless device based on the corresponding plurality of configurations of the configurable array of reflective elements.

Aspect 21 is an apparatus for wireless communication at a device including a memory and at least one processor coupled to the memory and, based at least in part on information stored in the memory, the at least one processor is configured to implement any of aspects 1 to 20.

Aspect 22 is the apparatus of aspect 21, further including a transceiver or an antenna coupled to the at least one processor.

Aspect 23 is an apparatus for wireless communication at a device including means for implementing any of aspects 1 to 20.

Aspect 24 is a computer-readable medium (e.g., a non-transitory computer-readable medium) storing computer executable code, where the code when executed by a processor causes the processor to implement any of aspects 1 to 20.

What is claimed is:

1. An apparatus for wireless communication at a wireless device, comprising:

memory;

at least one transceiver; and at least one processor coupled to the memory and, based at least in part on stored information that is stored in the memory, the at least one processor is configured to:

receive a plurality of beamformed reference signal transmissions associated with a corresponding plurality of beamforming configurations of a configurable array of reflective elements;

measure a received signal power for each of the plurality of beamformed reference signal transmissions;

determine an ordering of the plurality of beamformed reference signal transmissions based on measurement of the received signal power for each of the plurality of beamformed reference signal transmissions; and transmit, via the at least one transceiver and based on the plurality of beamformed reference signal transmissions, information indicating an estimated distance from the wireless device to the configurable array of reflective elements, wherein the information indicating the estimated distance is based on the ordering of the received signal power measured for each of the plurality of beamformed reference signal transmissions, and wherein the information indicating the estimated distance comprises at least one of a first indication of the ordering, a second indication of the estimated distance based on the ordering, or a third indication of an estimated range of distances based on the ordering.

2. The apparatus of claim 1, wherein to transmit the information indicating the estimated distance the at least one processor is configured to:

transmit an indication of a set of received signal powers measured for each of the plurality of beamformed reference signal transmissions.

3. The apparatus of claim 1, wherein the information indicating the estimated distance is transmitted to at least one of a base station, a network node, or a controller of the configurable array of reflective elements.

4. The apparatus of claim 1, wherein the at least one processor is further configured to:

receive, via the at least one transceiver, at least one signal from the configurable array of reflective elements in a configuration based on the information indicating the estimated distance.

5. The apparatus of claim 4, wherein the configuration is a beam focusing configuration of the configurable array of reflective elements associated with steering a beam towards a direction and focusing the beam at a specific distance based on the estimated distance.

6. The apparatus of claim 4, wherein the configuration is associated with a beamforming configuration of the configurable array of reflective elements associated with steering a beam towards a direction without an associated focusing distance.

7. The apparatus of claim 1, wherein the corresponding plurality of beamforming configurations is a first corresponding plurality of beamforming configurations comprising at least a first beamforming configuration using a first number of elements for a first beamforming operation and a second beamforming configuration using a second number of elements for a second beamforming operation, wherein the plurality of beamformed reference signal transmissions is a first plurality of beamformed reference signal transmission received during a first time period, wherein the information indicating the estimated distance is first information indicating a first range of distances, and wherein the at least one processor is further configured to:

receive, based on the first information and during a second time period, a second plurality of beamformed reference signal transmissions associated with a second corresponding plurality of beamforming configurations of the configurable array of reflective elements; and transmit, via the at least one transceiver and based on the second plurality of beamformed reference signal transmissions, second information indicating a second range of distances from the wireless device to the configurable array of reflective elements, wherein the second range of distances is included in, and narrower than, the first range of distances.

8. The apparatus of claim 1, wherein the at least one processor is further configured to:

receive configuration information relating to the plurality of beamformed reference signal transmissions associated with the corresponding plurality of beamforming configurations, wherein the configuration information comprises an indication of resources associated with each beamformed reference signal transmission in the plurality of beamformed reference signal transmissions and a corresponding beamforming configuration in the corresponding plurality of beamforming configurations.

9. The apparatus of claim 1, wherein the configurable array of reflective elements is a reconfigurable intelligent surface.

10. An apparatus for wireless communication at a network device, comprising:

memory;

at least one transceiver; and at least one processor coupled to the memory and, based at least in part on stored information that is stored in the memory, the at least one processor is configured to:

transmit, or configure a configurable array of reflective elements to reflect, a plurality of reference signal transmissions associated with a corresponding plurality of beamforming configurations of the configurable array of reflective elements;

receive, via the at least one transceiver and based on the plurality of reference signal transmissions, information transmitted from a wireless device indicating an estimated distance from the wireless device to the configurable array of reflective elements, wherein the information is measurement information comprising one or more of a set of received signal powers associated with the plurality of reference signal transmissions or a set of relative received signal powers associated with the plurality of reference signal transmissions; and determine the estimated distance based on an ordering of received signal powers in the set of received signal powers or an ordering of relative received signal powers in the set of relative received signal powers.

11. The apparatus of claim 10, wherein the at least one processor is further configured to:

configure the configurable array of reflective elements in a configuration based on the information indicating the estimated distance; and reflect from the configurable array of reflective elements in the configuration, or transmit for reflection from the configurable array of reflective elements in the configuration, at least one signal.

12. The apparatus of claim 11, wherein the configuration is a beam focusing configuration of the configurable array of reflective elements associated with steering a beam towards a direction and focusing the beam at a specific distance based on the estimated distance.

13. The apparatus of claim 11, wherein the configuration is associated with a beamforming configuration of the configurable array of reflective elements associated with steering a beam towards a direction without an associated focusing distance.

14. The apparatus of claim 10, wherein the corresponding plurality of beamforming configurations is a first corresponding plurality of beamforming configurations comprising at least a first beamforming configuration using a first number of elements for a first beamforming operation and a second beamforming configuration using a second number of elements for a second beamforming operation, wherein the plurality of reference signal transmissions is a first plurality of reference signal transmission received during a first time period, wherein the information indicating the estimated distance is first information indicating a first range of distances, and wherein the at least one processor is further configured to:

transmit, or configure the configurable array of reflective elements to reflect, based on the first information and during a second time period, a second plurality of reference signal transmissions associated with a second corresponding plurality of beamforming configurations of the configurable array of reflective elements; and receive, via the at least one transceiver and based on the second plurality of reference signal transmissions, second information indicating a second range of distances from the wireless device to the configurable array of reflective elements, wherein the second range of distances is included in, and narrower than, the first range of distances.

15. The apparatus of claim 10, wherein the network device comprises a reconfigurable intelligent surface (RIS), wherein the at least one processor is further configured to:

receive configuration information relating to the plurality of reference signal transmissions associated with the corresponding plurality of beamforming configurations, wherein the configuration information comprises an indication of resources associated with each reference signal transmission in the plurality of reference signal transmissions and a corresponding configuration in the corresponding plurality of beamforming configurations.

16. The apparatus of claim 15, wherein the plurality of reference signal transmissions are from a network node, and wherein the at least one processor is further configured to:

reflect the plurality of reference signal transmissions from the network node toward the wireless device from the configurable array of reflective elements configured with the corresponding plurality of beamforming configurations of the configurable array of reflective elements.

17. The apparatus of claim 10, wherein the network device is at least a component of a base station and the configurable array of reflective elements is a reconfigurable intelligent surface, and wherein the at least one processor is further configured to:

transmit configuration information relating to the plurality of reference signal transmissions associated with the corresponding plurality of beamforming configurations, wherein the configuration information comprises an indication of resources associated with each reference signal transmission in the plurality of reference signal transmissions and a corresponding beamforming configuration in the corresponding plurality of beamforming configurations.

18. The apparatus of claim 10, wherein the network device is at least a component of a base station, and wherein the at least one processor is configured to transmit the plurality of reference signal transmissions to the configurable array of reflective elements for reflection to the wireless device based on the corresponding plurality of beamforming configurations of the configurable array of reflective elements.

19. A method of wireless communication at a wireless device, comprising:

receiving a plurality of beamformed reference signal transmissions associated with a corresponding plurality of beamforming configurations of a configurable array of reflective elements;

measuring a received signal power for each of the plurality of beamformed reference signal transmissions;

determining an ordering of the plurality of beamformed reference signal transmissions based on measurement of the received signal power for each of the plurality of beamformed reference signal transmissions; and transmitting, via at least one transceiver of the wireless device and based on the plurality of beamformed reference signal transmissions, information indicating an estimated distance from the wireless device to the configurable array of reflective elements, wherein the information indicating the estimated distance is based on the ordering of the received signal power measured for each of the plurality of beamformed reference signal transmissions, and wherein the information indicating the estimated distance comprises at least one of a first indication of the ordering, a second indication of the estimated distance based on the ordering, a third indication of an estimated range of distances based on the ordering, or a fourth indication of a set of received signal powers based on the received signal power measured for each of the plurality of beamformed reference signal transmissions.

20. The method of claim 19, further comprising:

receiving, via the at least one transceiver, at least one signal from the configurable array of reflective elements in a configuration based on the information indicating the estimated distance.

21. The method of claim 19, wherein the corresponding plurality of beamforming configurations is a first corresponding plurality of beamforming configurations comprising at least a first beamforming configuration using a first number of elements for a first beamforming operation and a second beamforming configuration using a second number of elements for a second beamforming operation, wherein the plurality of beamformed reference signal transmissions is a first plurality of beamformed reference signal transmission received during a first time period, and wherein the information indicating the estimated distance is first information indicating a first range of distances, the method further comprising:

receiving, based on the first information and during a second time period, a second plurality of beamformed reference signal transmissions associated with a second corresponding plurality of beamforming configurations of the configurable array of reflective elements; and transmitting, via the at least one transceiver and based on the second plurality of beamformed reference signal transmissions, second information indicating a second range of distances from the wireless device to the configurable array of reflective elements, wherein the second range of distances is included in, and narrower than, the first range of distances.

22. The method of claim 19, further comprising:

receiving configuration information relating to the plurality of beamformed reference signal transmissions associated with the corresponding plurality of beamforming configurations, wherein the configuration information comprises an indication of resources associated with each beamformed reference signal transmission in the plurality of beamformed reference signal transmissions and a corresponding beamforming configuration in the corresponding plurality of beamforming configurations.

23. The method of claim 19, wherein the configurable array of reflective elements is a reconfigurable intelligent surface.

24. A method of wireless communication at a network device, comprising:

transmitting, or configuring a configurable array of reflective elements to reflect, a plurality of reference signal transmissions associated with a corresponding plurality of beamforming configurations of the configurable array of reflective elements;

receiving, via at least one transceiver of the network device and based on the plurality of reference signal transmissions, information transmitted from a wireless device indicating an estimated distance from the wireless device to the configurable array of reflective elements, wherein the information is measurement information comprising one or more of a set of received signal powers associated with the plurality of reference signal transmissions or a set of relative received signal powers associated with the plurality of reference signal transmissions; and determining the estimated distance based on an ordering of received signal powers in the set of received signal powers or an ordering of relative received signal powers in the set of relative received signal powers.

25. The method of claim 24, further comprising:

configuring the configurable array of reflective elements in a configuration based on the information indicating the estimated distance; and reflecting from the configurable array of reflective elements in the configuration, or transmitting for reflection from the configurable array of reflective elements in the configuration, at least one signal.

26. The method of claim 24, wherein the corresponding plurality of beamforming configurations is a first corresponding plurality of beamforming configurations comprising at least a first beamforming configuration using a first number of elements for a first beamforming operation and a second beamforming configuration using a second number of elements for a second beamforming operation, wherein the plurality of reference signal transmissions is a first plurality of reference signal transmission received during a first time period, and wherein the information indicating the estimated distance is first information indicating a first range of distances, the method further comprising:

transmitting, or configuring the configurable array of reflective elements to reflect, based on the first information and during a second time period, a second plurality of reference signal transmissions associated with a second corresponding plurality of beamforming configurations of the configurable array of reflective elements; and receiving, via the at least one transceiver and based on the second plurality of reference signal transmissions, second information indicating a second range of distances from the wireless device to the configurable array of reflective elements, wherein the second range of distances is included in, and narrower than, the first range of distances.

* * * * *